United States Patent
Yasui

(12) 
(10) Patent No.: US 10,775,798 B2
(45) Date of Patent: Sep. 15, 2020

(54) RUNNING TRACK DETERMINING DEVICE AND AUTOMATIC DRIVING APPARATUS

(71) Applicant: Honda Motor Co., Ltd., Tokyo (JP)

(72) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 15/993,598

(22) Filed: May 31, 2018

(65) Prior Publication Data

US 2018/0348770 A1 Dec. 6, 2018

(30) Foreign Application Priority Data

Jun. 2, 2017 (JP) .................................. 2017-110415

(51) Int. Cl.
*G05D 1/02* (2020.01)
*G05D 1/00* (2006.01)

(52) U.S. Cl.
CPC .......... *G05D 1/0214* (2013.01); *G05D 1/0088* (2013.01); *G05D 2201/0212* (2013.01)

(58) Field of Classification Search
CPC ................ G05D 1/0214; G05D 1/0088; G05D 2201/0212
See application file for complete search history.

(56) References Cited

U.S. PATENT DOCUMENTS

| 9,381,916 | B1* | 7/2016 | Zhu | G01S 13/867 |
| 9,381,917 | B1* | 7/2016 | Dolgov | G01S 17/931 |
| 9,487,139 | B1* | 11/2016 | Ishida | B60W 30/09 |
| 2008/0065328 | A1* | 3/2008 | Eidehall | G01S 13/867 |
| | | | | 701/301 |
| 2010/0104199 | A1* | 4/2010 | Zhang | G08G 1/165 |
| | | | | 382/199 |

(Continued)

FOREIGN PATENT DOCUMENTS

| CN | 102591332 | 7/2012 |
| JP | H0781604 | 3/1995 |

(Continued)

OTHER PUBLICATIONS

"Office Action of Japan Counterpart Application", dated Jan. 29, 2019, with English translation thereof, p. 1-p. 10.

(Continued)

*Primary Examiner* — Calvin Cheung
(74) *Attorney, Agent, or Firm* — JCIPRNET

(57) ABSTRACT

A running track determining device capable of appropriately determining a running track of a subject vehicle in the future in a speedy manner and an automatic driving apparatus including the running track determining device is provided. A running track determining device (1) includes an ECU (2). The ECU (2) calculates a risk potential (Prisk) representing an area having a possibility of the presence of a traffic participant from the present to the future in surroundings of the subject vehicle (3) in accordance with surrounding status data (D_info) detected by a status detecting device (4), calculates a benefit potential (Pbnf) representing an ideal running area in the future in which the subject vehicle (3) should run, and determines a running track (Tr_sk) of the subject vehicle (3) in the future by using the risk potential (Prisk) and the benefit potential (Pbnf).

16 Claims, 21 Drawing Sheets

(56) References Cited

U.S. PATENT DOCUMENTS

| | | | |
|---|---|---|---|
| 2010/0228419 A1* | 9/2010 | Lee | G05D 1/0257 701/25 |
| 2011/0190972 A1* | 8/2011 | Timmons | G01C 21/34 701/31.4 |
| 2015/0360687 A1* | 12/2015 | Meyer | B60W 10/20 701/70 |
| 2016/0121884 A1* | 5/2016 | Ciotlos | B60W 30/095 701/41 |
| 2016/0144838 A1* | 5/2016 | Spencer | G08G 1/166 701/70 |
| 2017/0031362 A1 | 2/2017 | Olson et al. | |
| 2017/0039855 A1* | 2/2017 | Maeda | B60W 30/09 |
| 2017/0183004 A1* | 6/2017 | Bonarens | B60W 30/09 |
| 2018/0233048 A1* | 8/2018 | Andersson | B60Q 5/006 |
| 2018/0345958 A1* | 12/2018 | Lo | G08G 1/166 |

FOREIGN PATENT DOCUMENTS

| | | |
|---|---|---|
| JP | 2002140798 | 5/2002 |
| JP | 2007253745 | 10/2007 |
| JP | 2010-191502 | 9/2010 |
| JP | 2013180638 | 9/2013 |
| JP | 2014031039 | 2/2014 |
| JP | 2014080046 | 5/2014 |
| JP | 2014211759 | 11/2014 |
| JP | 2015195009 | 11/2015 |
| JP | 2016148918 | 8/2016 |
| JP | 2017047694 | 3/2017 |
| WO | 2013051081 | 4/2013 |

OTHER PUBLICATIONS

"Office Action of Japan Counterpart Application", dated Jun. 11, 2019, with English translation thereof, p. 1-p. 6.

* cited by examiner

RUNNING TRACK DETERMINING DEVICE AND AUTOMATIC DRIVING APPARATUS

CROSS-REFERENCE TO RELATED APPLICATION

This application claims the priority of Japan patent application serial no. 2017-110415, filed on Jun. 2, 2017. The entirety of the above-mentioned patent application is hereby incorporated by reference herein and made a part of this specification.

BACKGROUND

Technical Field

The disclosure relates to a running track determining device and an automatic driving apparatus determining a future running track of a subject vehicle.

Description of Related Art

A running track determining device determining a future running track of a subject vehicle disclosed in Patent Document 1 is known. This running track determining device is applied to a mobile robot control device controlling a mobile robot vehicle (hereinafter, referred to as "subject vehicle"). This mobile robot control device includes: an external sensor that measures distance data between the subject vehicle and an obstacle disposed in a moving direction thereof; an antenna that is used for receiving positional information from the GPS or the like; a storage unit that stores map information including a running rule; an obstacle map generating unit; and the like. This obstacle map generating unit generates an obstacle map on the basis of distance data measured by an external sensor.

This running track determining device determines a future running track from a present position to a target position by using an algorithm illustrated in FIG. 10 of the same document. In other words, the present position of the subject vehicle is calculated on the basis of the moving amount of the subject vehicle, an obstacle map is generated on the basis of distance data measured by the external sensor, and map information is read from the storage unit (Steps 201 to 203).

Thereafter, it is determined whether or not an obstacle is present on a track stored in the map information by referring to the obstacle map and the map information (Step 204), and in a case in which an obstacle is present on the track, a search for a running track is executed using an A* search algorithm (Step 205). More specifically, presence probabilities (route search costs) of obstacles in a plurality of grids surrounding the subject vehicle on a grid map are calculated on the basis of the present positional information, the obstacle map, and the map information, and a grid having a lowest presence probability of an obstacle is determined/selected as a future running track. Then, a control command signal value for running the subject vehicle on the determined running track is calculated, and a control command signal corresponding thereto is input to a drive unit of the subject vehicle (Steps 206 and 207).

[Patent Document 1] Japanese Unexamined Patent Publication No. 2010-191502

According to the running track determining device disclosed in Patent Document 1, the presence probabilities of obstacles of a plurality of grids surrounding the subject vehicle need to be calculated in one calculation period based on the present positional information, the obstacle map, and the map information, and accordingly, the load of calculation of an arithmetic operation device is high. As a result, an increase in the manufacturing cost of the arithmetic operation device incurs, and there is a possibility that it will be difficult to perform an arithmetic operation using the capability of the arithmetic operation device that is currently mounted in the vehicle.

In addition, for the same reason, the arithmetic operation time of the arithmetic operation device becomes long, and there is concern that a state may be formed in which the arithmetic operation is not completed in one calculation period. In such a case, since the running track is not determined, a state in which the subject vehicle stops running or runs at a low speed to secure an arithmetic operation time occurs. As a result, the running track determining device cannot be applied to vehicles required to run at a high speed such as an automatic driving vehicle running on an ordinary road or an expressway, and the marketability is lowered.

In addition, under a condition in which there are a plurality of grids having a lowest presence probability of obstacles, there is a problem in that an optimal running track that is smooth and has a high degree of safety cannot be selected, and this problem becomes more remarkable in the case of the automatic driving vehicle described above. The problems described above similarly occur also in a case in which a CC-RRT method is used instead of the A* search algorithm in a search for a running track.

SUMMARY

The disclosure provides a running track determining device capable of appropriately determining a future running track of a subject vehicle in a speedy manner and an automatic driving apparatus including the running track determining device.

A running track determining device 1 according to Aspect 1 of the disclosure includes: a surrounding status data acquiring means (status detecting device 4) that acquires surrounding status data D_info representing a surrounding status of a subject vehicle 3; a presence area data calculating means (an ECU 2; a risk potential calculating unit 20) that calculates presence area data (risk potential Prisk) representing a presence area that is an area having a possibility of presence of a traffic participant (other vehicles 7, 7a to 7e and pedestrians 8, 8a, and 8b) from the present to the future or an area having a possibility of presence in the future in surroundings of the subject vehicle 3 using the surrounding status data D-info; a running track determining means (the ECU 2; a running environment model estimating unit 40) that determines a running track Tr_sk of the subject vehicle 3 in the future using the presence area data (risk potential Prisk) and a value acquired by correcting a predetermined function value (a reference running track wbs, a track weighting factor function value Wtr_i, or a reference road direction speed v_bs) using a correction value (a vertical speed correction coefficient kv, a track correction coefficient ktr, ktr_2, or ktr2_i, a speed correction coefficient kv_i, or a search track correction vector Kθ); and a correction value calculating means (the ECU 2 or an extreme value search controller 50) that calculates the correction value (a search track correction vector Kθ) using a predetermined algorithm (Equations (1) to (30)) such that the degree of crossing of the running track Tr_sk in the future and the presence area represented by the presence area data has a value near a minimum value or the minimum value.

According to this running track determining device, surrounding status data representing a surrounding status of a subject vehicle is acquired, presence area data representing a presence area that is an area having a possibility of presence of a traffic participant from the present to the future or an area having a possibility of presence in the future in surroundings of the subject vehicle is calculated using the surrounding status data, and a running track of the subject vehicle in the future is determined using the presence area data and a value acquired by correcting a predetermined function value using a correction value. Since this correction value is calculated using a predetermined algorithm such that the degree of crossing of the running track in the future and the presence area represented by the presence area data has a value near a minimum value or the minimum value, when the running track of the subject vehicle in the future is calculated, different from Patent Document 1, the presence probabilities of obstacles and the like in a plurality of grids surrounding the subject vehicle do not need to be calculated or estimated, and thus the running track of the subject vehicle in the future can be appropriately determined in a speedy manner while crossing of the running track of the subject vehicle in the future and a presence area of a traffic participant is avoided. Accordingly, in a case in which this running track determining device is applied to an automatic driving vehicle, similar to a case in which the automatic driving vehicle is driven by a skilled driver, a safe and ideal running state can be realized through automatic driving, and accordingly, high marketability can be secured (in this description, "acquisition" of "acquires surrounding status data" is not limited to direct detection of the surrounding status data using a sensor or the like and includes calculation of the surrounding status data using any other parameter; in addition, "traffic participant" in the description presented here includes a pedestrian, another vehicle, an obstacle, and the like).

According to Aspect 2 of the disclosure, in the running track determining device 1 described in Aspect 1, the predetermined function value (a reference running track wbs) is a function value that defines a form when the subject vehicle 3 changes a route as a map in advance.

According to this running track determining device, the running track of the subject vehicle in the future is determined using a value acquired by correcting the function value that defines a form when the subject vehicle changes a route as a map in advance using a correction value, and accordingly, while crossing of the running track of the subject vehicle in the future with the presence area of a traffic participant is avoided, it can be avoided to determine a running track in the future that cannot be followed by the subject vehicle. Accordingly, in a case in which this running track determining device is applied to an automatic driving vehicle, a safe and ideal running state can be realized through automatic driving while an unstable behavior such as spinning or meandering in the vehicle is prevented.

According to Aspect 3 of the disclosure, in the running track determining device 1 described in Aspect 2, the predetermined function value (reference running track wbs) is a function value that defines a route change speed when the subject vehicle 3 changes the route, and the correction value (a vertical speed correction coefficient kv or a track correction coefficient ktr or ktr_2) is configured to correct the route change speed.

According to this running track determining device, the predetermined function value is a function value that defines a route change speed when the subject vehicle changes the route, and the correction value is configured to correct the route change speed, whereby the horizontal speed of the subject vehicle can be appropriately set. Accordingly, in a case in which this running track determining device is applied to an automatic driving vehicle, smooth automatic driving can be realized.

According to Aspect 4 of the disclosure, in the running track determining device 1 described in Aspect 1, the predetermined function value is configured of a plurality of function values intersecting with each other, the correction value is configured of a plurality of correction values (track correction coefficients ktr2_i), and the running track determining means determines the running track Tr_sk in the future by composing a plurality of values acquired by correcting the plurality of function values (track weighting factor function values Wtr_i) using the plurality of correction values (track correction coefficients ktr2_i).

According to this running track determining device, since the predetermined function value is configured of a plurality of function values intersecting with each other, the correction value is configured of a plurality of correction values, and the running track determining means determines the running track in the future by composing a plurality of values acquired by correcting the plurality of function values using the plurality of correction values, whereby the running track in the future under a condition such as a case in which, while avoiding crossing of the running track of the subject vehicle in the future with a presence area of a traffic participant, after the subject vehicle changes its route to the left side, the route is changed to the right side or a case in which zigzag running is repeated can be appropriately set. Accordingly, in a case in which this running track determining device is applied to an automatic driving vehicle, smooth and safe automatic driving can be realized in a case in which, after the subject vehicle changes its route to the left side, the route is changed to the right side, a case in which zigzag running is repeated, or the like.

According to Aspect 5 of the disclosure, in the running track determining device 1 described in Aspect 1, the predetermined function value is configured of a function value acquired by combining a plurality of segments in a state having an angle therebetween, and the correction value (speed correction coefficient kv_i) is configured to correct at least one of lengths of the plurality of segments and the angle.

According to this running track determining device, since the predetermined function value is configured of a function value acquired by combining a plurality of segments forming an angle, and the correction value is configured to correct at least one of lengths of the plurality of segments and the angle, the running track in the future under a condition such as a case in which, while avoiding crossing of the running track of the subject vehicle in the future with a presence area of a traffic participant, the subject vehicle makes a left turn or a right turn at an intersection or a case of merging in an expressway can be appropriately set. Accordingly, in a case in which this running track determining device is applied to an automatic driving vehicle, under a condition such as a case in which the subject vehicle makes a left turn or a right turn at an intersection or a case of merging in an expressway, smooth and safe automatic driving can be realized.

According to Aspect 6 of the disclosure, in the running track determining device 1 described in any one of Aspects 1 to 5, the correction value calculating means calculates a direction value (moving average value Pa_i) representing a direction of a change in the degree of crossing of the running track Tr_sk in the future and the presence area represented by the presence area data when the running track Tr_sk in the future is changed using the predetermined algorithm (Equations (1) to (30)) and calculates the correction value (search track correction vector K) such that the running track Tr_sk in the future is changed in a direction in which the degree of crossing with the presence area decreases using the direction value (moving average value Pa_i).

According to this running track determining device, since the correction value calculating means calculates a direction value representing a direction of a change in the degree of crossing of the running track in the future and the presence area represented by the presence area data when the running track in the future is changed using the predetermined algorithm and calculates the correction value such that the running track in the future is changed in a direction in which the degree of crossing with the presence area decreases using the direction value, a calculation time at the time of calculating the running track in the future can be shortened, and the calculation load can be decreased. As a result, the manufacturing cost of the running track determining device can be decreased, and the running track determining device can be realized using an arithmetic operation device having relatively low capability. From the same reason, in a case in which this running track determining device is applied to an automatic driving vehicle, high-speed running of the automatic driving vehicle can be realized.

According to Aspect 7 of the disclosure, in the running track determining device 1 described in any one of Aspects 1 to 6, a no-running area data calculating means (ECU 2; risk potential calculating unit 20) that calculates no-running area data (risk potential Prisk) representing a no-running area in which the subject vehicle 3 should not run using the surrounding status data D_info is further included, and the correction value calculating means calculates the correction value (search track correction vector Kθ) such that the degree of crossing of the running track Tr_sk in the future and the no-running area (risk potential Prisk) represented by the no-running area data has a value near a minimum value or the minimum value in addition to the degree of crossing of the running track Tr_sk in the future and the presence area (risk potential Prisk) represented by the presence area data using the predetermined algorithm (Equations (1) to (30)).

According to this running track determining device, since no-running area data representing a no-running area in which the subject vehicle should not run is calculated using the surrounding status data, and the correction value is calculated such that the degree of crossing of the running track in the future and the no-running area represented by the no-running area data has a value near a minimum value or the minimum value in addition to the degree of crossing of the running track in the future and the presence area represented by the presence area data using the predetermined algorithm, the running track of the subject vehicle in the future can be prevented from crossing the no-running area. Accordingly, in a case in which this running track determining device is applied to an automatic driving vehicle, an ideal running state can be realized through automatic driving while higher safety is secured.

According to Aspect 8 of the disclosure, in the running track determining device 1 described in any one of Aspects 1 to 6, a running area data calculating means (ECU 2; benefit potential calculating unit 21) that calculates running area data (benefit potential Pbnf) representing an ideal running area in the future in which the subject vehicle 3 should run is further included, the correction value calculating means calculates the correction value (search track correction vector Kθ) using the predetermined algorithm (Equations (1) to (30)) such that the degree of crossing of the running track Tr_sk in the future and the presence area represented by the presence area data has a value near a minimum value or the minimum value, and the degree of crossing of the running track Tr_sk in the future and the running area represented by the running area data has a value near a maximum value or the maximum value.

According to this running track determining device, since running area data representing an ideal running area in the future in which the subject vehicle should run is calculated, and the correction value is calculated using the predetermined algorithm such that the degree of crossing of the running track in the future and the presence area represented by the presence area data has a value near a minimum value or the minimum value, and the degree of crossing of the running track in the future and the running area represented by the running area data has a value near a maximum value or the maximum value, while avoiding crossing of the running track of the subject vehicle in the future with the presence area of a traffic participant, the running track can be appropriately determined in a speedy manner to cross an ideal running area in the future as much as possible.

According to Aspect 9 of the disclosure, in the running track determining device 1 described in Aspect 8, the correction value calculating means, in a case in which the running area represented by the running area data and the presence area represented by the presence area data cross each other, calculates the correction value (search track correction vector Kθ) such that the degree of crossing of the running track Tr_sk in the future and the presence area represented by the presence area data decreases as a presence probability of the traffic participant in the crossing area increases.

According to this running track determining device, in a case in which the running area represented by the running area data and the presence area represented by the presence area data cross each other, since the correction value is calculated such that the degree of crossing of the running track in the future and the presence area represented by the presence area data decreases as a presence probability of the traffic participant in the crossing area increases, under a condition in which the ideal running area in the future and a presence area of a traffic participant cross each other, the running track of the subject vehicle in the future can be appropriately determined in a speedy manner while the probability of the presence of a traffic participant on the running track is decreased.

According to Aspect 10 of the disclosure, there is provided a running track determining device 1 including: a surrounding status data acquiring means (status detecting device 4) that acquires surrounding status data D_info representing a surrounding status of a subject vehicle 3; a presence area data calculating means (ECU 2; risk potential calculating unit 20) that calculates presence area data (risk potential Prisk) representing a presence area that is an area having a possibility of presence of a traffic participant (another vehicle 7 or 7a to 7e or a pedestrian 8, 8a, or 8b) from the present to the future or an area having a possibility of presence in the future in surroundings of the subject vehicle 3 using the surrounding status data D_info; a running area data calculating means (ECU 2; benefit potential calculating unit 21) that calculates running area data (benefit potential Pbnf) representing an ideal running area in the future in which the subject vehicle 3 should run; and a running track determining means (ECU 2; running environment model estimating unit 40) that determines a running track Tr_sk of the subject vehicle 3 in the future using the presence area data (risk potential Prisk) and the running area data (benefit potential Pbnf).

According to this running track determining device, surrounding status data representing a surrounding status of a subject vehicle is acquired, presence area data representing a presence area that is an area having a possibility of presence of a traffic participant from the present to the future or an area having a possibility of presence in the future in surroundings of the subject vehicle is calculated using the surrounding status data, and running area data representing an ideal running area in the future in which the subject vehicle should run is calculated. Then, a running track of the subject vehicle in the future is determined using the presence area data and the running area data, and accordingly, when the running track of the subject vehicle in the future is calculated, different from Patent Document 1, the presence probabilities of obstacles and the like in a plurality of grids surrounding the subject vehicle do not need to be calculated or estimated, and thus the running track of the subject vehicle in the future can be appropriately determined in a speedy manner while crossing of the running track of the subject vehicle in the future and a presence area of a traffic participant is avoided. Accordingly, in a case in which this running track determining device is applied to an automatic driving vehicle, similar to a case in which the automatic driving vehicle is driven by a skilled driver, a safe and ideal running state can be realized through automatic driving, and a high-speed running state can be realized through automatic driving. Accordingly, high marketability can be secured.

According to Aspect 11 of the disclosure, in the running track determining device 1 described in Aspect 10, the running track determining means determines the running track Tr_sk in the future such that the degree of crossing of the running track Tr_sk in the future and the presence area represented by the presence area data (risk potential Prisk) has a value near a minimum value or the minimum value, and the degree of crossing of the running track Tr_sk in the future and the running area represented by the running area (benefit potential Pbnf) data has a value near a maximum value or the maximum value.

According to this running track determining device, since the running track in the future is determined such that the degree of crossing of the running track in the future and the presence area represented by the presence area data has a value near a minimum value or the minimum value, and the degree of crossing of the running track in the future and the running area represented by the running area data has a value near a maximum value or the maximum value, while avoiding crossing of the running track of the subject vehicle in the future with the presence area of a traffic participant, the running track can be appropriately determined in a speedy manner to cross with an ideal running area in the future as much as possible. Accordingly, in a case in which this running track determining device is applied to an automatic driving vehicle, similar to a case in which the automatic driving vehicle is driven by a skilled driver, a safe and ideal running state can be realized through automatic driving, and accordingly, high marketability can be secured.

According to Aspect 12 of the disclosure, in the running track determining device 1 described in Aspect 10 or 11, the running track determining means determines a reference running track (reference track wbs) that is a reference of the running track Tr_sk in the future and determines the running track Tr_sk in the future by correcting the reference running track (reference track wbs) such that the degree of crossing of the running track Tr_sk in the future and the area represented by the presence area data has a value near a minimum value or the minimum value, and the degree of crossing of the running track Tr_sk in the future and the running area represented by the running area data has a value near a maximum value or the maximum value.

According to this running track determining device, since a reference running track that is a reference of the running track in the future is determined, and the running track in the future is determined by correcting the reference running track such that the degree of crossing of the running track in the future and the area represented by the presence area data has a value near a minimum value or the minimum value, and the degree of crossing of the running track in the future and the running area represented by the running area data has a value near a maximum value or the maximum value, while avoiding crossing with the presence area of a traffic participant, the running track in the future can be appropriately determined in a speedy manner to cross with an ideal running area in the future as much as possible.

According to Aspect 13 of the disclosure, in the running track determining device 1 described in Aspect 11, the running track determining means, in a case in which the running area represented by the running area data and the presence area represented by the presence area data cross each other, determines the running track Tr_sk in the future such that the degree of crossing of the running track Tr_sk in the future and the presence area represented by the presence area data decreases as a presence probability of the traffic participant in the crossing area increases.

According to this running track determining device, in a case in which the running area represented by the running area data and the presence area represented by the presence area data cross each other, since the running track in the future is determined such that the degree of crossing of the running track in the future and the presence area represented by the presence area data decreases as a presence probability of the traffic participant in the crossing area increases, in a case in which the ideal running area in the future and the presence area of a traffic participant cross each other, the running track of the subject vehicle in the future can be appropriately determined in a speedy manner while the probability of the presence of a traffic participant on the running track is decreased.

An automatic driving apparatus 1 according to Aspect 14 of the disclosure includes the running track determining device 1 according to any one of Aspects 1 to 13, and a running state of the subject vehicle 3 is controlled to run in the running track Tr_sk in the future that is determined by the running track determining device 1.

According to this automatic driving apparatus, since the running state of the subject vehicle is controlled to run in the running track in the future that is determined by the running track determining device described in any one of Aspects 1 to 13, a safe and ideal running state can be realized through automatic driving, and high marketability can be secured.

DESCRIPTION OF THE EMBODIMENTS

Hereinafter, a running track determining device and an automatic driving apparatus according to one embodiment of the invention will be described with reference to the drawings. Since the automatic driving apparatus according to this embodiment is used also as a running track determining device, in the following description, together with description of the automatic driving apparatus, within the description, the function and the configuration of the running track determining device will also be described.

Figure 1:
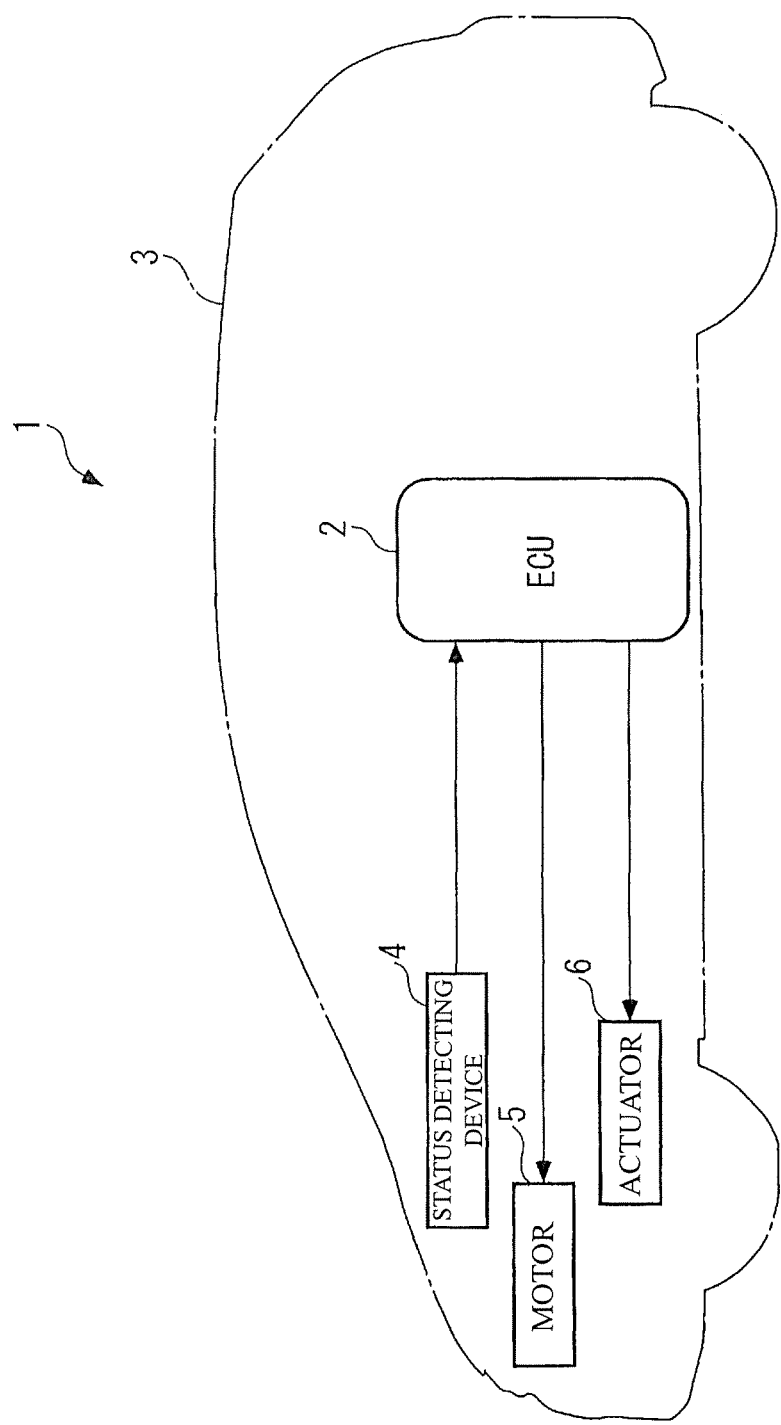
FIG. 1 is a diagram schematically illustrating an automatic driving apparatus and a running track determining device according to one embodiment of the invention and the configuration of a vehicle to which these are applied.

As illustrated in FIG. 1, this automatic driving apparatus 1 is applied to a four-wheel vehicle 3, and includes an ECU 2. In the following description, the vehicle 3 including this automatic driving apparatus 1 will be referred to as "a subject vehicle 3."

A status detecting device 4, a motor 5, and an actuator 6 are electrically connected to this ECU 2. This status detecting device 4 (surrounding status data acquiring means) is configured of a camera, a millimeter-wave radar, a laser radar, a sonar, the GPS, various sensors, and the like and outputs surrounding status data D-info representing the position of the subject vehicle 3, a surrounding status (a traffic environment, traffic participants, and the like) of the subject vehicle 3 in the traveling direction to the ECU 2.

The ECU 2, as will be described later, recognizes the position of the subject vehicle 3 and the traffic environment, traffic participants, and the like of the surroundings of the subject vehicle 3 on the basis of the surrounding status data D_info supplied from the status detecting device 4 and determines a future running track of the subject vehicle 3.

The motor 5, for example, is configured of an electric motor or the like and, as will be described later, when a future running track of the subject vehicle 3 is determined, the output of the motor 5 is controlled by the ECU 2 such that the subject vehicle 3 runs on this running track.

In addition, the actuator 6 is configured of a braking actuator, a steering actuator, and the like and, as will be described later, when a future running track of the subject vehicle 3 is determined, the operation of the actuator 6 is controlled by the ECU 2 such that the subject vehicle 3 runs on the running track.

Meanwhile, the ECU 2 is configured of a microcomputer formed of a CPU, a RAM, a ROM, an E2PROM, an I/O interface, various electric circuits (none of which is illustrated in the drawing), and the like and, as will be described later, performs a running track determining process and the like on the basis of the surrounding status data D_info supplied from the status detecting device 4 described above and the like. In this embodiment, the ECU 2 corresponds to a presence area data calculating means, a running track determining means, a no-running area data calculating means, and a running area data calculating means.

Next, the functional configuration of the automatic driving apparatus 1 according to this embodiment will be described with reference to FIG. 2. This automatic driving apparatus 1 calculates a running track Tr_sk using a calculation algorithm to be described below and performs control of the running state of the subject vehicle 3 such that the subject vehicle runs on this running track Tr_sk.

Figure 2:
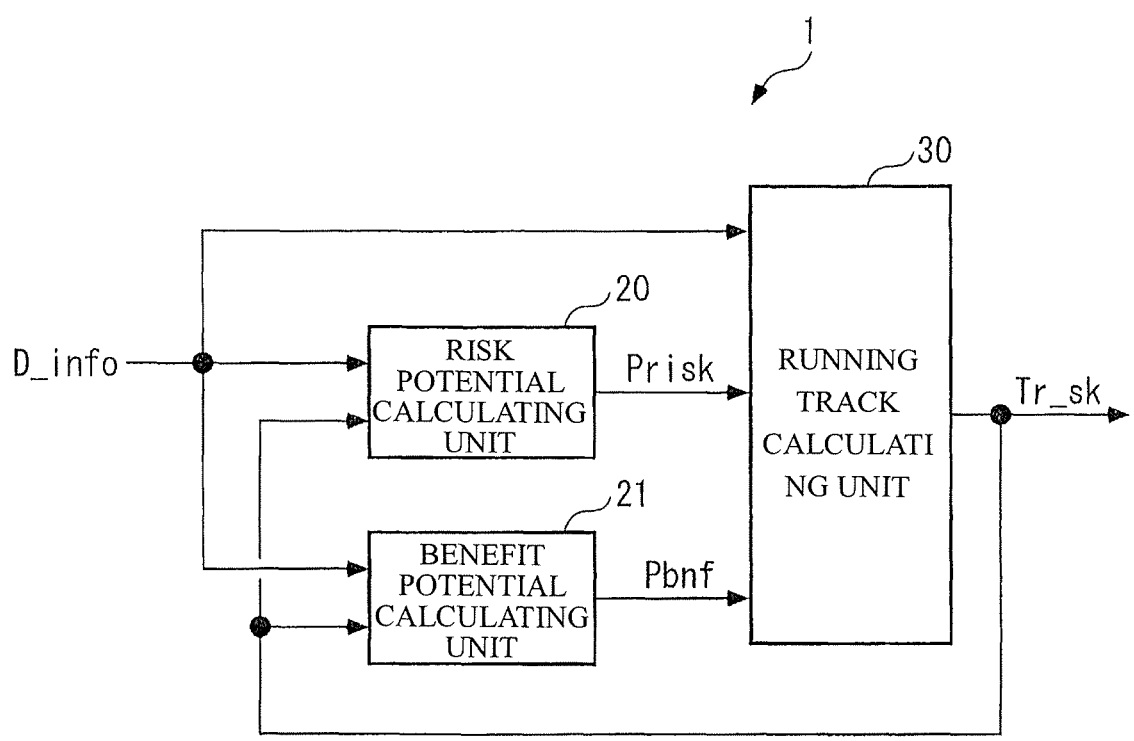
FIG. 2 is a block diagram illustrating the functional configuration of an automatic driving apparatus.

As illustrated in FIG. 2, the automatic driving apparatus 1 includes a risk potential calculating unit 20, a benefit potential calculating unit 21, and a running track calculating unit 30 and, more specifically, such components 20, 21, 30 are configured of the ECU 2.

First, the risk potential calculating unit 20 will be described. This risk potential calculating unit 20 generates the presence probability of each traffic participant (a pedestrian or a vehicle) from the present to the future and a map (not illustrated in the drawing) representing an area in which running should not be performed on the basis of the surrounding status data D_info described above and searches this map in accordance with a running track Tr_sk, thereby calculating the risk potential Prisk. This risk potential Prisk represents values indicating an area having a possibility (probability) of the presence of a traffic participant in the surroundings in the traveling direction of the subject vehicle 3, an area having a possibility (probability) of the presence of a no-running area, in which the subject vehicle 3 should not run, and the like from the present to the future and, more specifically, is calculated as illustrated in FIGS. 3 to 5.

Figure 3:
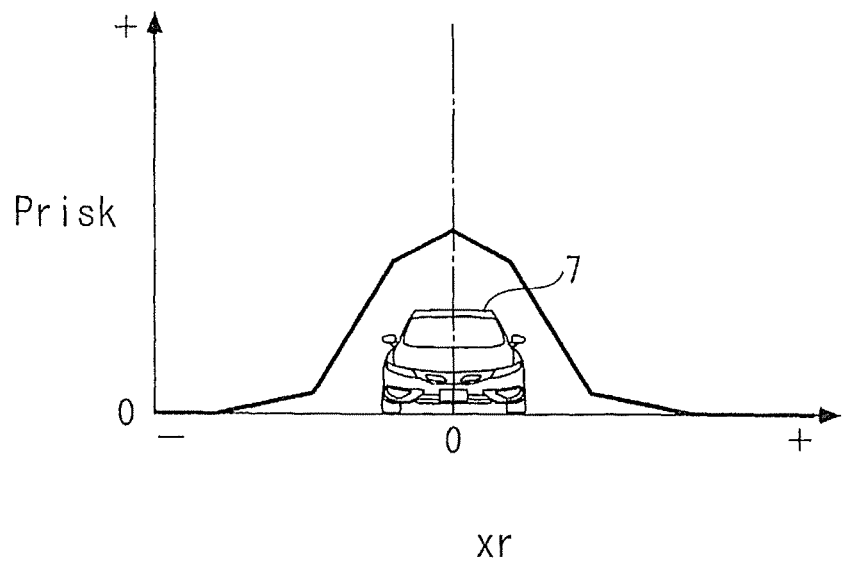
FIG. 3 is a diagram illustrating one example of a result of calculation of risk potential Prisk of another vehicle.

First, FIG. 3 illustrates one example of a result of calculation of the risk potential Prisk of another vehicle 7 under a running environment in which another vehicle 7 is present in the traveling direction of the subject vehicle 3. In the drawing, a value xr in the horizontal axis represents a relative position between the subject vehicle 3 and the other vehicle 7 in a horizontal direction that is orthogonal to the traveling direction of the subject vehicle 3. This relative position xr has a value of "0" at the center position of the other vehicle 7, has a negative value set on the left side of the other vehicle 7, and has a positive value set on the right side thereof. As illustrated in the drawing, the risk potential Prisk of the other vehicle 7 is calculated as a value "0" in an area in which the presence probability of the other vehicle 7 is low. On the other hand, as the presence probability increases, the risk potential Prisk is calculated as a larger positive value. In FIGS. 3 to 5, for the convenience of representation, the risk potential Prisk is represented in a form acquired by combining straight lines.

Figure 4:
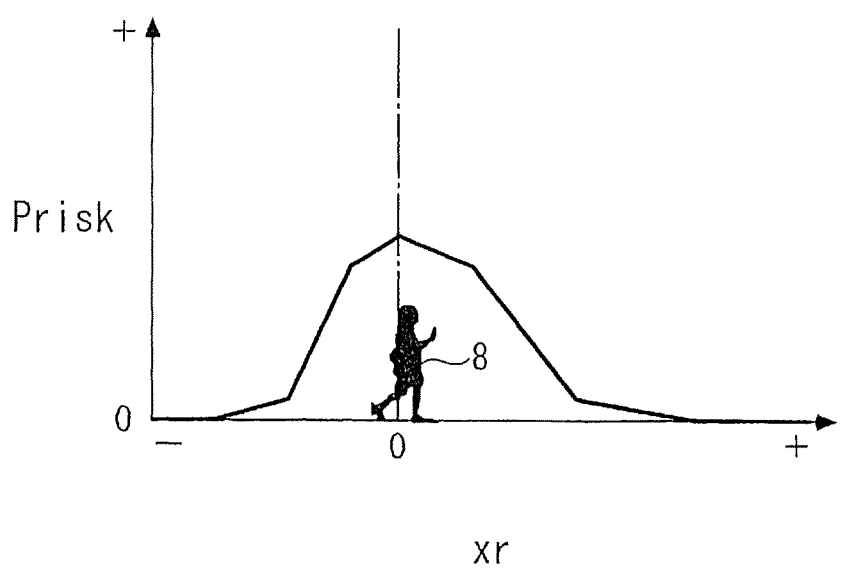
FIG. 4 is a diagram illustrating one example of a result of calculation of risk potential Prisk of a pedestrian.

In addition, FIG. 4 illustrates one example of a result of calculation of the risk potential Prisk of a pedestrian 8 under a running environment in which a pedestrian 8 is present in the traveling direction of the subject vehicle 3. As illustrated in the drawing, the risk potential Prisk of the pedestrian 8, similar to the case of the other vehicle 7, is calculated as a value "0" in an area in which the presence probability of the pedestrian 8 is low. On the other hand, as the presence probability increases, the risk potential Prisk is calculated as a larger positive value.

Figure 5:
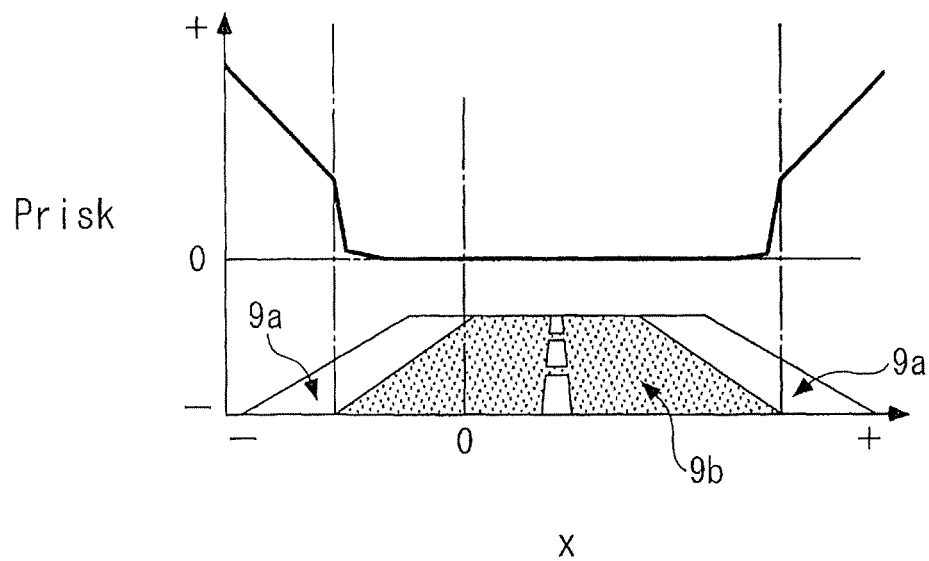
FIG. 5 is a diagram illustrating one example of a result of calculation of risk potential Prisk under a running environment in which a traffic participant is not present on a running lane of a subject vehicle.

Furthermore, FIG. 5 illustrates one example of a result of calculation of the risk potential Prisk under a running environment in which no traffic participant is present in the traveling direction of the subject vehicle 3. The risk potential Prisk of this case, as in the case of a sidewalk 9a illustrated in the drawing, is a value representing a running avoidance probability in a non-running area in which the subject vehicle 3 should not run. In the drawing, a value x in the horizontal axis represents the absolute position of the subject vehicle 3 in the widthwise direction of the subject vehicle 3, in other words, in the horizontal direction. This absolute position x has a value of "0" at the center position of the subject vehicle 3, is set to a negative value on the left side of the subject vehicle 3, and is set to a positive value on the right side thereof. This point similarly applies to a case illustrated in FIG. 6.

As illustrated in the drawing, the risk potential Prisk under a running environment in which no traffic participant is present in the traveling direction of the subject vehicle 3 is calculated as a map value with respect to the absolute position x. More specifically, the risk potential Prisk is calculated to increase near a boundary between a driveway 9b and the sidewalk 9a and is calculated as a larger positive value as the absolute position is farther from the driveway 9b within the sidewalk 9a.

In this embodiment, the risk potential calculating unit 20 corresponds to a presence area data calculating means and a non-running area data calculating means, and the risk potential Prisk corresponds to presence area data and non-running area data.

Next, the benefit potential calculating unit 21 will be described. This benefit potential calculating unit 21 searches a map that is not illustrated in the drawing in accordance with the surrounding status data D_info and the running track Tr_sk (a running track Tr_sk on which the subject vehicle 3 has run until now), thereby calculating benefit potential Pbnf. This benefit potential Pbnf is a value representing a presence probability of an ideal running area in the traveling direction when the subject vehicle 3 runs and, more specifically, is calculated, for example, as illustrated in FIGS. 6 and 7.

Figure 6:
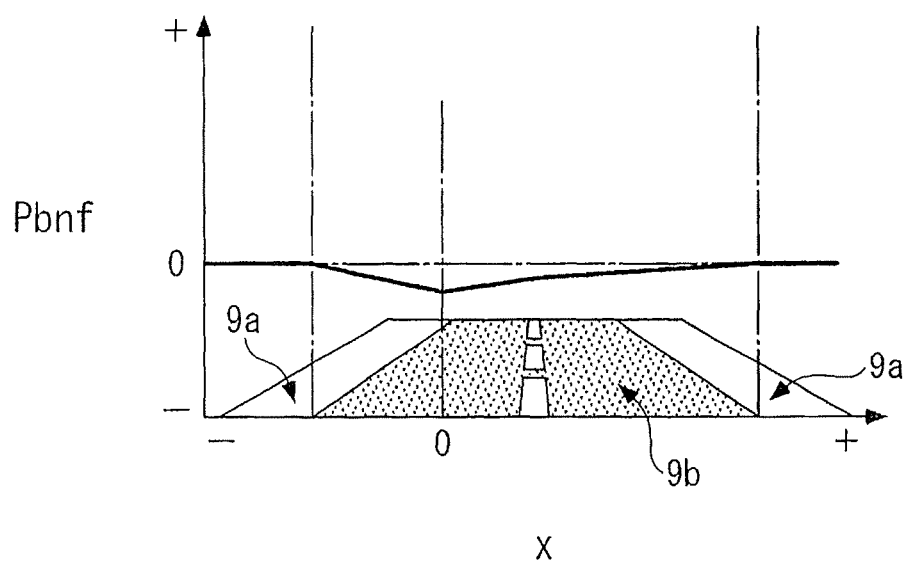
FIG. 6 is a diagram illustrating one example of a result of calculation of benefit potential Pbnf under a running environment in which no traffic participant is present on a running lane of the subject vehicle.

FIG. 6 illustrates one example of a result of calculation of benefit potential Pbnf under a running environment in which no traffic participant is present in the traveling direction of the subject vehicle 3. As illustrated in the drawing, the benefit potential Pbnf is calculated as a negative value or a value of "0," is calculated as a minimum value at the most ideal running position (a point denoted using "*"), and is calculated to have an absolute value that decreases as the running position is further from the most ideal running position in the horizontal direction. In FIG. 6, for the convenience of representation, the benefit potential Pbnf is represented in a form acquired by combining straight lines.

Figure 7:
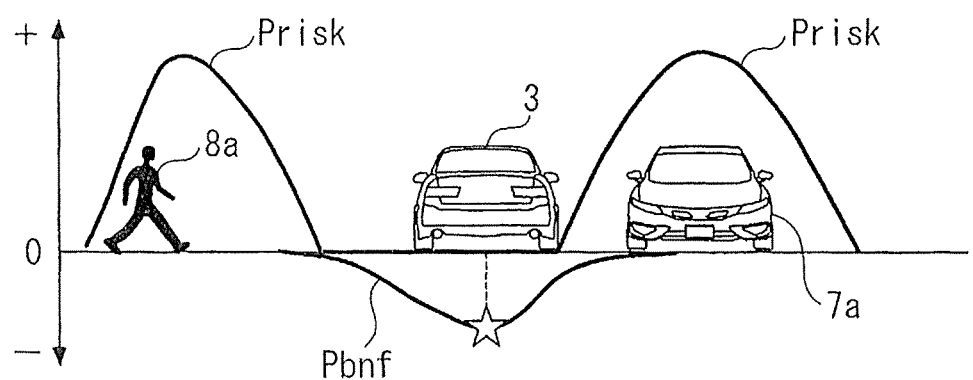
FIG. 7 is a diagram illustrating one example of results of calculation of benefit potential Pbnf and risk potential Prisk under a running environment in which a traffic participant is present.

In addition, during actual running of the subject vehicle 3, for example, as illustrated in FIG. 7, a running environment in which traffic participants such as a pedestrian 8a, another vehicle 7a, and the like are present occurs. In the case of the running environment illustrated in FIG. 7, benefit potential Pbnf and risk potential Prisk are calculated as illustrated in the drawing.

In addition, the benefit potential Pbnf may be calculated by learning running data of a skilled driver by using a deep neural network having the surrounding status data D_info and the running track Tr_sk as inputs and the benefit potential Pbnf as an output. Furthermore, a function value used for determining an optimal path of a skilled driver may be extracted from running data of the skilled driver by using a technique of reverse reinforcement learning, and the benefit potential Pbnf may be calculated by using this function value.

In this embodiment, the benefit potential calculating unit 21 corresponds to a running area data calculating means, and the benefit potential Pbnf corresponds to running area data.

Figure 8:
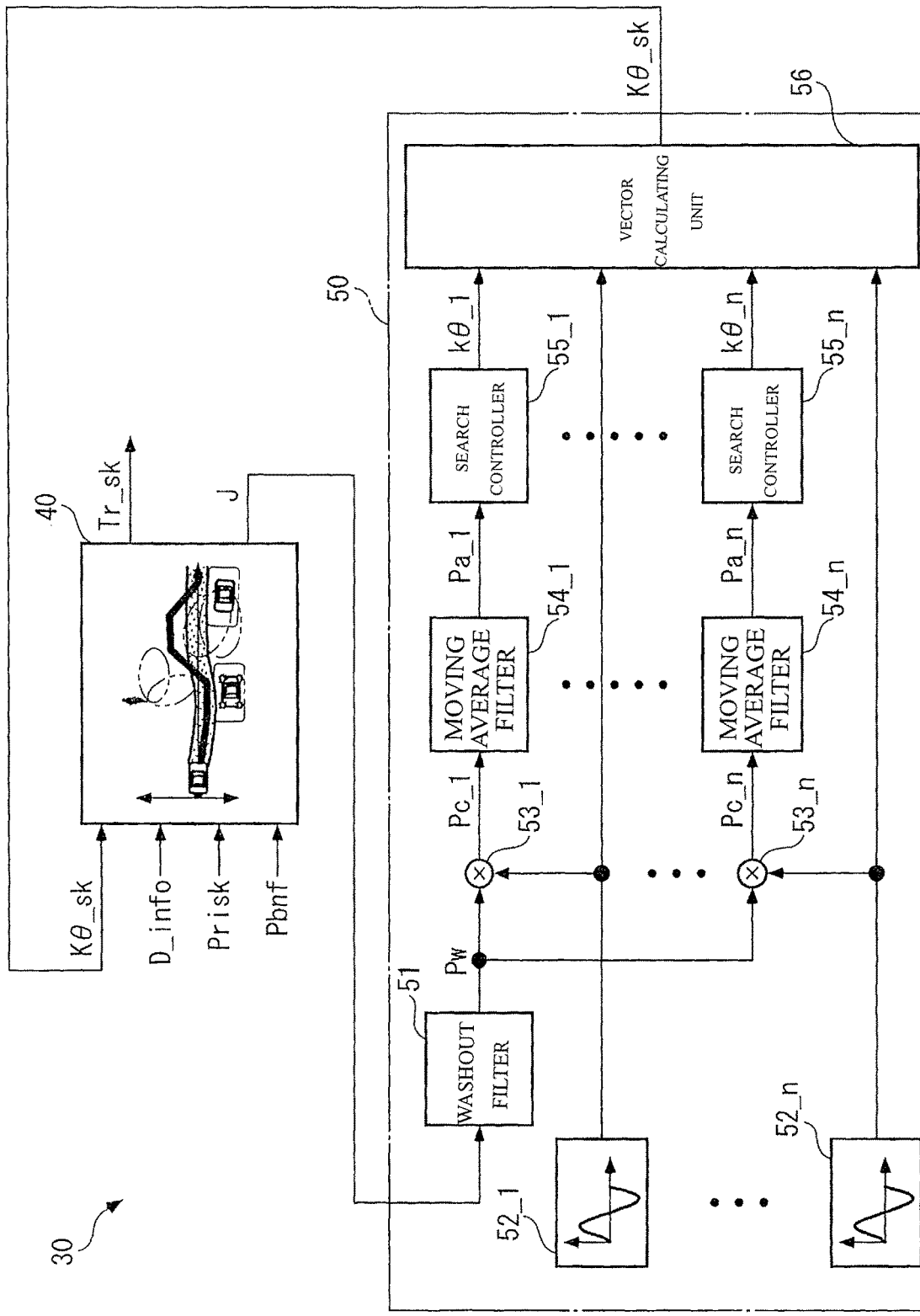
FIG. 8 is a block diagram illustrating the configuration of a running track calculating unit.

Next, the running track calculating unit 30 will be described with reference to FIG. 8. This running track calculating unit 30, as will be described below, calculates (searches for) a running track Tr_sk, and this running track Tr_sk corresponds to a track in which the subject vehicle 3 should run from the present to the future. As illustrated in the drawing, the running track calculating unit 30 includes a running environment model estimating unit 40 and an extreme value search controller 50.

This running environment model estimating unit 40 (running track determining means), as will be described later, calculates a running track Tr_sk using the surrounding status data D_info and a final search track correction vector Kθ_sk supplied from the extreme value search controller 50, calculates an evaluation function value J, and outputs the evaluation function value J to the extreme value search controller 50.

In addition, the extreme value search controller 50 (correction value calculating means) calculates the final search track correction vector Kθ_sk described above using the evaluation function value J input from the running environment model estimating unit 40 and outputs the final search track correction vector to the running environment model estimating unit 40.

Next, the running environment model estimating unit 40 described above will be described. This running environment model estimating unit 40, first, as will be described below, selects one of running track calculating techniques of Types 1 to 4 in accordance with the surrounding status data D_info and calculates a running track Tr_sk using the selected running track calculating technique. In the following description, a position of the subject vehicle 3 in the traveling direction will be referred to as "vertical position," and a position in the widthwise direction will be referred to as "horizontal position."

First, the running track calculating technique of Type 1 will be described. In the case of the running track calculating technique of this Type 1, a reference running track wbs that is the reference of the running track Tr_sk is defined as the function value illustrated in FIG. 9. This reference running track wbs (a predetermined function value) defines a relation between a relative horizontal position xf of the subject vehicle 3 and a normalized time tn when the subject vehicle 3 runs at a reference vertical speed vl_bs in the traveling direction, in other words, a route change speed of the subject vehicle 3.

In this case, the relative horizontal position xf of the vertical axis represents the center position of the subject vehicle 3 as a value of "0," represents a relative position on the right side as a positive value, and represents a relative position on the left side as a negative value. In addition, the normalized time tn of the horizontal axis is a value representing a time in the future when the subject vehicle 3 runs at the reference vertical speed vl_bs in the traveling direction, and normalized time tn=0 represents the present time. As described above, since the reference running track wbs is defined together with the reference vertical speed vl_bs, when a time in the future that is an elapsed time in the future from the present is tf, and a relative vertical position with respect to the present position in the case of running at the reference vertical speed vl_bs is yf, the reference running track represents a relative vertical position yf and a vertical speed vl at the time tf in the future. Accordingly, the reference running track wbs can be defined by substituting the normalized time tn of the horizontal axis illustrated in FIG. 9 with the time tf in the future or the relative vertical position yf.

A running track Tr_sk at an arbitrary time tf* in the future is calculated as shown below by using the reference running track wbs represented in FIG. 9 and the track correction coefficient ktr and the vertical speed correction coefficient kv used for correcting the reference running track. This track correction coefficient ktr (correction value) is set to a value within a predetermined range (for example, a range in which the absolute value of wbs·ktr does not exceed a main road width) of positive and negative values in accordance with the surrounding status data D_info described above, and in a case in which the reference vertical speed vl_bs is set to the smaller one of a legal speed limit and a set speed requested by a driver, the vertical speed correction coefficient kv is set to a value within a range in which 1≤kv is satisfied in accordance with the surrounding status data D_info described above.

First, a vertical speed vl at the arbitrary time tf* in the future is calculated using the following Equation (1).

$$vl = kv \cdot vl\_bs \quad (1)$$

Thereafter, a relative vertical position yf* at the arbitrary time tf* in the future is calculated using the following Equation (2).

$$yf^* = vl \cdot tf^* = kv \cdot vl\_bs \cdot tf^* \quad (2)$$

Next, an arbitrary normalized time tn* is calculated using the following Equation (3).

$$tn^* = tf^*/kv \quad (3)$$

Figure 9:
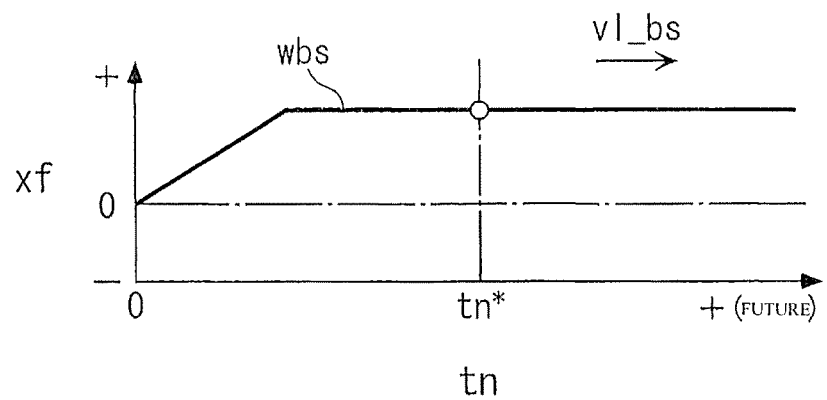
FIG. 9 is a diagram illustrating a function value defining a reference running track wbs used in a running track calculating technique of Type 1.

In addition, a reference running track wbs is calculated by searching FIG. 9 in accordance with the arbitrary normalized time tn* calculated in Equation (3) described above.

Then, finally, a running track Tr_sk is calculated using the following Equation (4).

$$Tr\_sk = ktr \cdot wbs \quad (4)$$

The running track Tr_sk is calculated using the technique described above and thus is calculated as a function F(ktr, kv, tf*) having the track correction coefficient ktr, the vertical speed correction coefficient kv, and the arbitrary time tf* in the future as independent variables. Here, in a case in which the search track correction vector Kθ (correction value) is defined as represented in the following Equation (5), the running track Tr_sk is calculated as a function F(Kθ, tf*) having the search track correction vector Kθ, and the arbitrary time tf* in the future as independent variables.

$$K\theta = [ktr \; kv] \quad (5)$$

In the case of the calculating technique of Type 1 described above, for example, when kv=1 and ktr=1 are satisfied, as is apparent with reference to Equations (1) and (4) described above, vl=vl_bs and Tr_sk=wbs are satisfied, and thus the running track Tr_sk is calculated as being the same as the reference running track wbs illustrated in FIG. 9.

Figure 10:
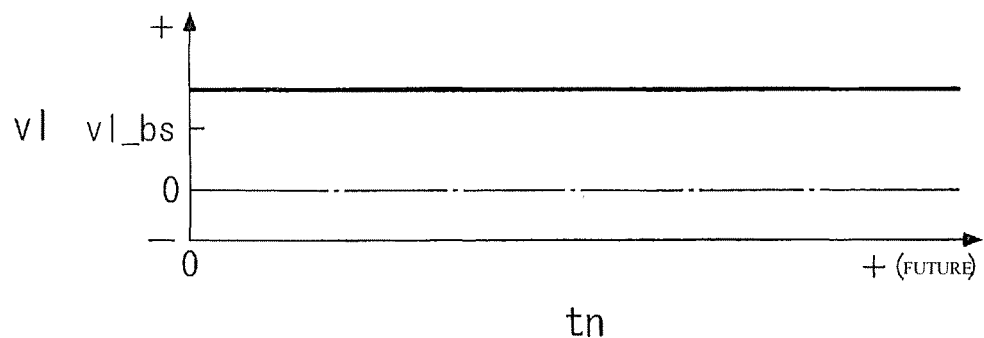
FIG. 10 is a diagram illustrating one example of a result of calculation of a vertical speed vl when kv>1 and ktr<1 are satisfied in the running track calculating technique of Type 1.
Figure 11:
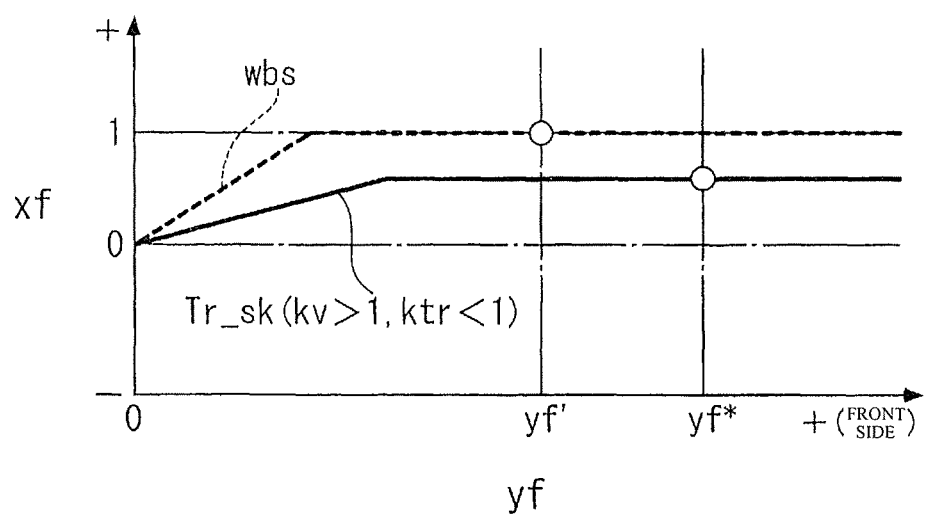
FIG. 11 is a diagram illustrating one example of a result of calculation of a running track Tr_sk when kv>1 and ktr<1 are satisfied in the running track calculating technique of Type 1.

On the other hand, for example, when kv>1 and ktr<1 are satisfied, as is apparent with reference to Equations (1) and (4) described above, the vertical speed vl has a value (see FIG. 10) larger than the reference vertical speed vl_bs, and the relative horizontal position of the running track Tr_sk has a value smaller than the reference running track wbs. As a result, the running track Tr_sk is calculated as illustrated in FIG. 11. FIG. 11 represents the relative vertical position yf in the horizontal axis for easy understanding.

In the drawing, yf and yf* represent relative vertical positions corresponding to the arbitrary normalized time tn* when kv=1 and ktr=1 are satisfied, and when kv>1 and ktr<1 are satisfied. As illustrated in the drawing, in a case in which kv>1 and ktr<1 are satisfied, vl>vl_bs is satisfied. Accordingly, the relative vertical position yf* is a position moved further forward than the relative vertical position yf at the time when kv=1 and ktr=1 are satisfied, and the relative horizontal position has a value smaller than that at the time when kv=1 and ktr=1 are satisfied.

In this case, FIG. 11 represents the relative vertical position yf in the horizontal axis for easy understanding, but as described above, the horizontal axis may be substituted with the normalized time to or the time tf in the future. For this reason, in the case of the running track calculating technique of this Type 1, the actual running track Tr_sk is calculated in association with the time tf in the future. This point similarly applies to the running track calculating techniques of Type 2 and Type 3 to be described below.

The running track calculating technique of Type 1 described above, for example, is a technique that is optimal for calculating the running track Tr_sk under a running environment in which a preceding vehicle is to be overtaken (see FIG. 27 to be described later) or a running environment in which a lane change or the like is performed.

Figure 12:
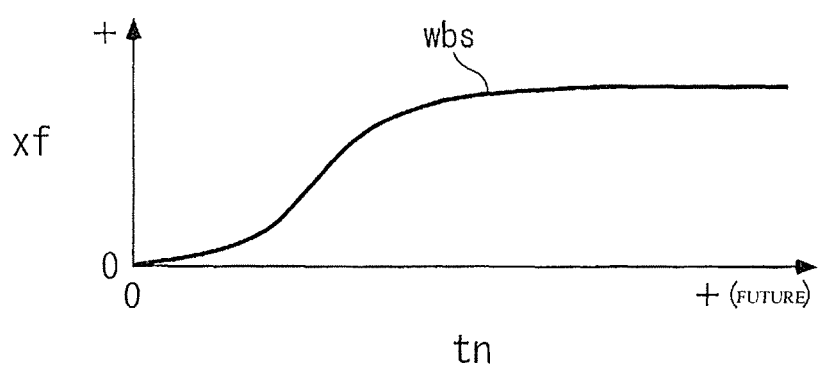
FIG. 12 is a diagram illustrating a modified example of a function value defining a reference running track wbs used in the running track calculating technique of Type 1.

In addition, in the running track calculating technique of Type 1, instead of the function value illustrated in FIG. 9, a function value in consideration of the steering characteristics of the vehicle, as illustrated in FIG. 12, may be used as the reference running track wbs.

Next, the running track calculating technique of Type 2 described above will be described. In the case of the running track calculating technique of this Type 2, the reference track wbs is defined as a function value illustrated in FIG. 13. As is apparent from comparison of the function value illustrated in FIG. 13 with the function value illustrated in FIG. 9 described above, in the case of the function value illustrated in FIG. 13, a plurality of reference running tracks wbs are set, and such a plurality of reference running tracks wbs are set as map values according to a first running track setting value ktr_1. This first track setting value ktr_1 is for setting (selecting) a moving speed at the time of changing the position of the running track in the leftward/rightward direction and is set to a value within a predetermined range (for example, a range in which the absolute value of wbs·ktr_1 does not exceed the main road width) of positive and negative values in accordance with the surrounding status data D_info described above.

In addition, in the case of the running track calculating technique of this Type 2, a value corresponding to the track correction coefficient ktr according to the running track calculating technique of Type 1 described above is set as a second track correction coefficient ktr_2 (correction value). In other words, in a case in which the reference vertical speed vl_bs is set to a smaller one of the legal speed limit and a set speed requested from the driver, the second track correction coefficient ktr_2 is set to a value within a range in which −1≤ktr_2≤1 is satisfied in accordance with the surrounding status data D_info described above. Then, the running track Tr_sk at arbitrary time tf* in the future is calculated as below using the function value of the reference running track wbs, the first track setting value ktr_1, the second track correction coefficient ktr_2, and the vertical speed correction coefficient kv illustrated in FIG. 13.

First, the vertical speed vl at arbitrary time tf* in the future is calculated using the following Equation (6).

$$vl = kv \cdot vl\_bs \quad (6)$$

Next, a relative vertical position at arbitrary time tf* in the future is calculated using the following Equation (7).

$$yf^* = vl \cdot tf^* = kv \cdot vl\_bs \cdot tf^* \quad (7)$$

Next, arbitrary normalized time tn* is calculated using the following Equation (8).

$$tn^* = tf^*/kv \quad (8)$$

Figure 13:
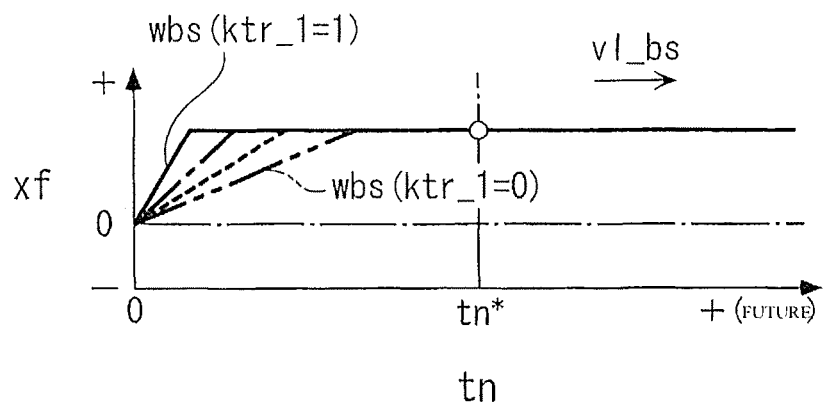
FIG. 13 is a diagram illustrating a function value defining a reference running track wbs used in a running track calculating technique of Type 2.

In addition, the reference running track wbs is calculated by searching FIG. 13 in accordance with the arbitrary normalized time tn* and the first track setting value ktr_1 calculated using Equation (8) represented above.

Then, finally, the running track Tr_sk is calculated using the following Equation (9).

$$Tr\_sk = ktr\_2 \cdot wbs \quad (9)$$

The running track Tr_sk is calculated using the technique described above and thus is calculated as a function F(ktr_1, ktr_2, kv, tf*) having the first track setting value ktr_1, the second track correction coefficient ktr_2, the vertical speed correction coefficient kv, and the arbitrary time tf* in the future as independent variables. Here, in a case in which the search track correction vector Kθ (correction value) is defined as represented in the following Equation (10), the running track Tr_sk is calculated as a function F(Kθ, tf*) having the search track correction vector Kθ and the arbitrary time tf* in the future as independent variables.

$$K\theta = [ktr\_1\; ktr\_2\; kv] \quad (10)$$

In the case of the running track calculating technique of Type 2 described above, for example, when kv=1, ktr_1=0, and ktr_2=1 are satisfied, as is apparent by referring to Equations (6) and (9) described above, vl=vl_bs and Tr_sk=wbs are satisfied. Accordingly, the running track Tr_sk is calculated as being the same as the reference running track wbs at the time of ktr_1=0 illustrated in FIG. 13.

On the other hand, for example, when kv>1, ktr_1=0.5, and ktr_2<1 are satisfied, as is apparent by referring to Equations (6) and (9) represented above, the vertical speed vl has a value larger than the reference vertical speed vl_bs (please refer to FIG. 10 described above), and the relative horizontal position of the running track Tr_sk has a value smaller than that of the reference running track wbs at the time of ktr_1=0.5. As a result, the running track Tr_sk is calculated as illustrated in FIG. 14.

In other words, as illustrated in the drawing, when kv>1, ktr_1=0.5, and ktr_2<1 are satisfied, the relative vertical position yf* is a position moved to a further front side than the relative vertical position yf' at the time when kv=1, ktr_1=0.5, and ktr_2=1 are satisfied, and the relative horizontal position has a value smaller than that at the time when kv=1, ktr_1=0.5, and ktr_2=1 are satisfied.

Figure 14:
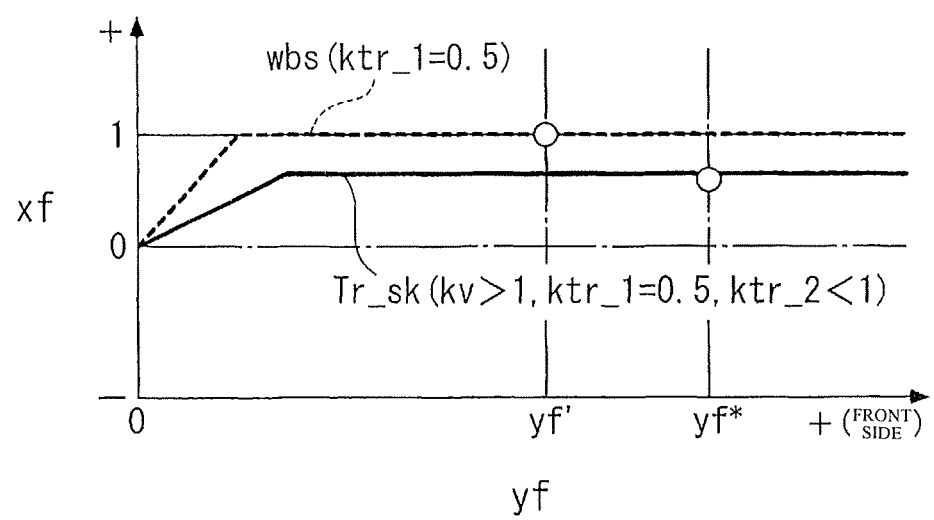
FIG. 14 is a diagram illustrating one example of a result of calculation of a running track Tr_sk when kv>1, ktr_1=0.5, and ktr_2<1 are satisfied in the running track calculating technique of Type 2.

In this case, for easy understanding, while FIG. 14 represents the relative vertical position yf in the horizontal axis, in the case of the running track calculating technique of this Type 2, the actual running track Tr_sk is calculated in a state being associated with the time tf in the future.

The running track calculating technique of Type 2 described above, similar to the running track calculating technique of Type 1, for example, is a technique that is optimal for calculating the running track Tr_sk under a running environment in which a front running vehicle is to be overtaken or a running environment in which a lane change or the like is performed.

Figure 15:
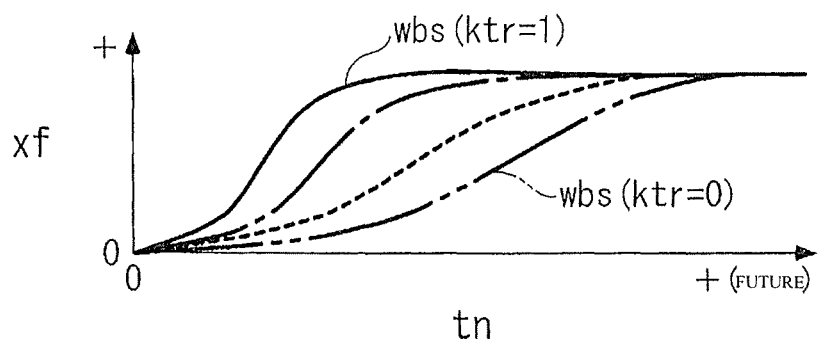
FIG. 15 is a diagram illustrating a modified example of a function value defining a reference running track wbs used in the running track calculating technique of Type 2.

In addition, in the running track calculating technique of Type 2, instead of the function value illustrated in FIG. 13, a function value in consideration of the steering characteristics of the vehicle, as illustrated in FIG. 15, may be used as the reference running track wbs.

Figure 16:
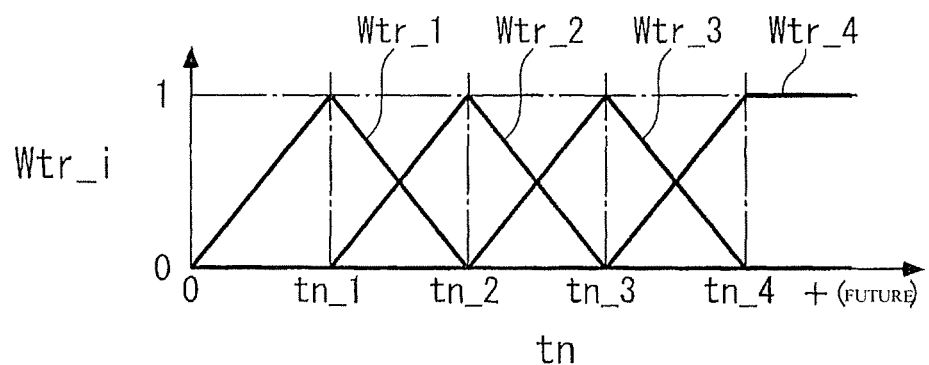
FIG. 16 is a diagram illustrating a track weighting factor function value Wtr_i used in a running track calculating technique of Type 3.

Next, the running track calculating technique of Type 3 described above will be described. In the case of the running track calculating technique of this Type 3, first, as illustrated in FIG. 16, four track weighting factor function values Wtr_i (here, i=1 to 4) are defined for the normalized time tn.

As illustrated in the diagram, the four track weighting factor function values Wtr_i (predetermined function values) are set in correspondence with areas defined by four predetermined values tn_1 to tn_4 of the normalized time tn. The first track weighting factor function value Wtr_1 is set to be in correspondence with a first area defined in a period of 0 to tn_2, the second track weighting factor function value Wtr_2 is set to be in correspondence with a second area defined in a period of tn_1 to tn_3, the third track weighting factor function value Wtr_3 is set to be in correspondence with a third area defined in a period of tn_2 to tn_4, and the fourth track weighting factor function value Wtr_4 is set to be in correspondence with a fourth area defined in a period of tn_4 to future.

In addition, each of the four track weighting factor function values Wtr_i is set to a positive value of "1" or less in a corresponding area described above and is set to a value of "0" in the other areas. Furthermore, two track weighting factor function values adjacent to each other are set to overlap with each other and are set such that a sum of two track weighting factor function values of an overlapping portion is a value of "1."

In addition, in the running track calculating technique of this Type 3, four track correction coefficients ktr2_i (i=1 to 4) are used. Such four track correction coefficients ktr2 (correction values) are set to values within a predetermined range of positive and negative values (for example, a range in which the absolute value of Wtr_i·ktr2_i does not exceed the main road width) in accordance with the surrounding status data D_info.

Then, the running track Tr_sk at arbitrary time tf* in the future is calculated as below using the four track weighting factor function values Wtr_i, the vertical speed correction coefficient kv, and the four track correction coefficients ktr2_i illustrated in FIG. 16.

First, the vertical speed vl at arbitrary time tf* in the future is calculated using the following Equation (11).

$$vl = kv \cdot vl\_bs \qquad (11)$$

Thereafter, the relative vertical position yf* at arbitrary time tf* in the future is calculated using the following Equation (12).

$$yf^* = vl \cdot tf^* = kv \cdot vl\_bs \cdot tf^* \qquad (12)$$

Next, arbitrary normalized time tn* is calculated using the following Equation (13).

$$tn^* = tf^*/kv \qquad (13)$$

In addition, by searching FIG. 16 in accordance with arbitrary normalized time tn* calculated using Equation (13) represented above, four track weighting factor function values Wtr_i are calculated.

Then, finally, the running track Tr_sk is calculated using the following Equation (14).

$$Tr\_sk = \sum_{i=1}^{4} ktr2\_i \cdot Wtr\_i \qquad (14)$$

In the case of the running track calculating technique of this Type 3, the running track Tr_sk is calculated using the technique described above and thus is calculated as a function F(ktr2_i, kv, tf*) having four track correction coefficients ktr2_i, the vertical speed correction coefficient kv, and the arbitrary time tf* in the future as independent variables. Here, in a case in which the search track correction vector Kθ (correction value) is defined as represented in the following Equation (15), the running track Tr_sk is calculated as a function F(Kθ, tf*) having the search track correction vector Kθ and the arbitrary time tf* in the future as independent variables. In addition, the value of this search track correction vector Kθ is calculated by the extreme value search controller 50 using a technique to be described later.

$$K\theta = [ktr2\_1 \, ktr2\_2 \, ktr2\_3 \, ktr2\_4 \, kv] \qquad (15)$$

Figure 17:
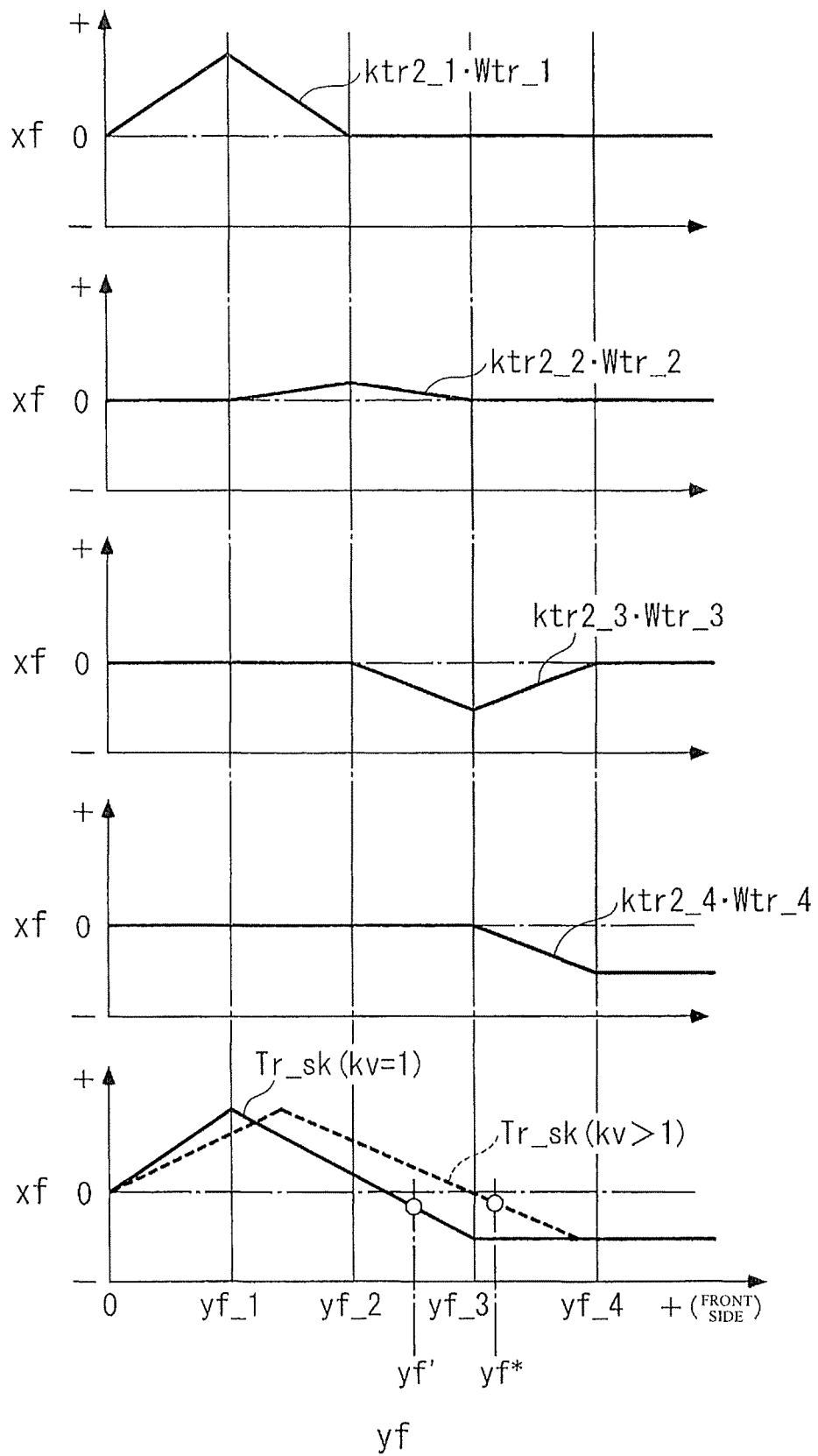
FIG. 17 is a diagram illustrating one example of a result of calculation of a running track Tr_sk when kv=1 or kv>1 is satisfied in the running track calculating technique of Type 3.

In the case of the running track calculating technique of Type 3 described above, the running track Tr_sk, for example, is calculated as a value denoted by a solid line illustrated in FIG. 17 when kv=1 is satisfied and is calculated as a value denoted by a broken line illustrated in FIG. 17 when kv>1 is satisfied. In the drawing, yf_1 to yf_4 are the values of relative vertical positions yf corresponding to the normalized times tn_1 to tn_4 when kv=1 is satisfied.

In the drawing, yf' and yf* respectively represent relative vertical positions corresponding to arbitrary normalized time tn* when kv=1 is satisfied and when kv>1 is satisfied. As illustrated in the drawing, the relative vertical position yf* when kv>1 is satisfied, since vl>vl_bs is satisfied, is a position moved to a further front side than the relative vertical position yf' when kv=1 is satisfied.

In this case, for easy understanding, while FIG. 17 illustrates the relative vertical position yf in the horizontal axis, in the case of the running track calculating technique of this Type 3, the actual running track Tr_sk is calculated in a state being associated with the time tf in the future.

The running track calculating technique of Type 3 described above is a technique that is optimal for calculating the running track Tr_sk under a complicate running environment such as a case of running on a busy street or a case of running while avoiding traffic participants in a zigzag pattern (see FIG. 19 to be described later).

In addition, in the running track calculating technique of Type 3, although four values Wtr1 to Wtr4 are used as the track weighting factor function values Wtr_i, the number of track weighting factor function values Wtr_i is not limited thereto, and two or three or five or more function values may be used. In such a case, the number of track correction coefficients ktr2_i may be the same as the number of the track weighting factor function values Wtr_i.

Figure 18:
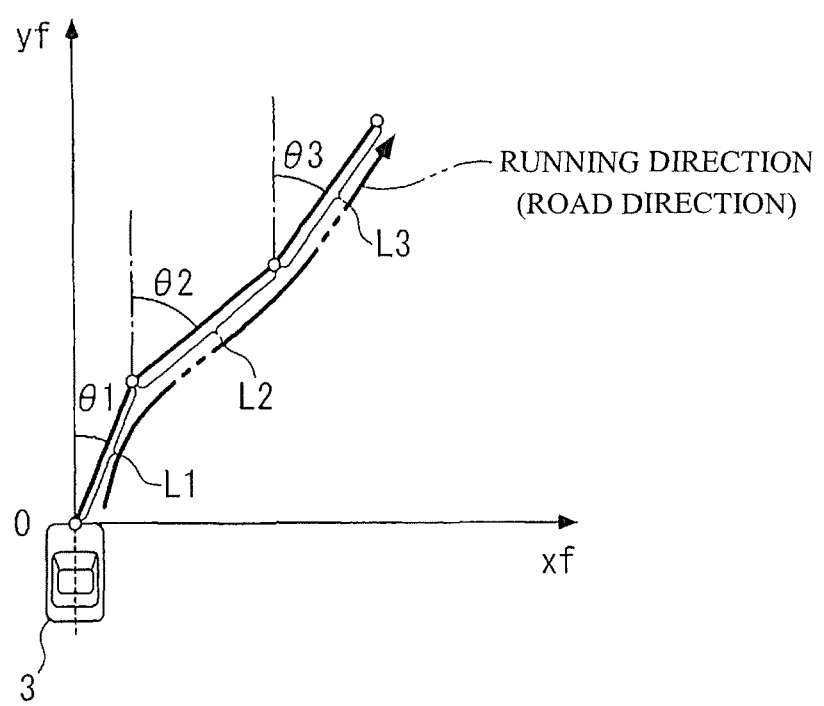
FIG. 18 is a diagram for describing a running track calculating technique of Type 4.

Next, the running track calculating technique of Type 4 described above will be described. In the case of the running track calculating technique of Type 4, as illustrated in FIG. 18, the running track Tr_sk is determined/calculated, in a plane having the relative horizontal position xf of the subject vehicle 3 as a horizontal axis and the relative vertical position yf as a vertical axis, by combining every two of n (here, n≥2) segments in a state in which an angle is formed therebetween.

More specifically, first, by using the following Equation (16), a local track distance Li (here, i=1 to n) is calculated. This local track distance Li corresponds to the length of each of n segments.

$$Li = kv\_i \cdot vb\_s \cdot \Delta t \tag{16}$$

In Equation (16) represented above, kv_i (here, i=1 to n) represents a speed correction coefficient (correction value), v_bs represents a reference road direction speed (a predetermined function value), and Δt represents a local section running time. This local section running time Δt is a time for the subject vehicle 3 to run the local track distance Li.

Next, a relative vertical position yf* at arbitrary time tf* in the future is calculated using the following Equation (17).

$$yf^* = \sum_{i=1}^{n} Li \cdot \cos \theta i \tag{17}$$

In Equation (17) represented above, θi, as illustrated in FIG. 18, is an angle of each segment with respect to the center line of the subject vehicle 3 at the current time point.

Next, a relative horizontal position xf* at arbitrary time tf* in the future is calculated using the following Equation (18).

$$xf^* = \sum_{i=1}^{n} Li \cdot \sin \theta i \tag{18}$$

Then, a running track Tr_sk is calculated using the following Equation (19).

$$Tr\_sk = [xf^* \, yf^*] \tag{19}$$

In addition, a road direction speed v is calculated using the following Equation (20). This road direction speed v is a speed in the running direction of the subject vehicle 3.

$$v = kv\_i \cdot v\_bs \tag{20}$$

The running track Tr_sk is calculated using the technique described above and thus is calculated as a function F(kv_i, θi, tf*) having n speed correction coefficients kv_i, n angles θi, and arbitrary time tf* in the future as independent variables. Here, in a case in which the search track correction vector Kθ (correction value) is defined as represented in the following Equation (21), the running track Tr_sk is calculated as a function F(Kθ, tf*) having the search track correction vector Kθ and the arbitrary time t1 in the future as independent variables. The value of this search track correction vector Kθ is calculated by the extreme value search controller 50 using a technique to be described later.

$$K\theta = [kv\_1 \ldots kv\_n \theta 1 \ldots \theta n] \tag{21}$$

In the case of the running track calculating technique of this Type 4, an angle θi is included in Equations (17) and (18) for calculating the search track correction vector Kθ, and thus, when the running track Tr_sk is calculated, an angle between every two segments adjacent to each other is corrected (changed) using the search track correction vector Kθ.

In addition, in the running track calculating technique of Type 4, the search track correction vector Kθ may be configured as a vector having only n speed correction coefficients kv_i or n angles θi as its elements.

As above, the running environment model estimating unit 40 selects one of the running track calculating techniques of Types 1 to 4 on the basis of the surrounding status data D_info, and the running track Tr_sk is calculated using the selected running track calculating technique.

In addition, in the description presented above, in the running track calculating techniques of Types 1 to 4, although the running track Tr_sk has been described as being calculated using the search track correction vector Kθ, in the actual calculation of the running track Tr_sk, for a reason to be described later, instead of the search track correction vector Kθ, a final search track correction vector Kθ_sk calculated by the extreme value search controller 50 is used.

In addition, the running environment model estimating unit 40 generates a running environment model, for example, illustrated in FIG. 19 on the basis of the running track Tr_sk, the risk potential Prisk, and the benefit potential Pbnf and calculates an evaluation function value J in a predetermined calculation period (search period) ΔTsk using the running environment model illustrated in FIG. 19 by using a technique to be described below.

Figure 19:
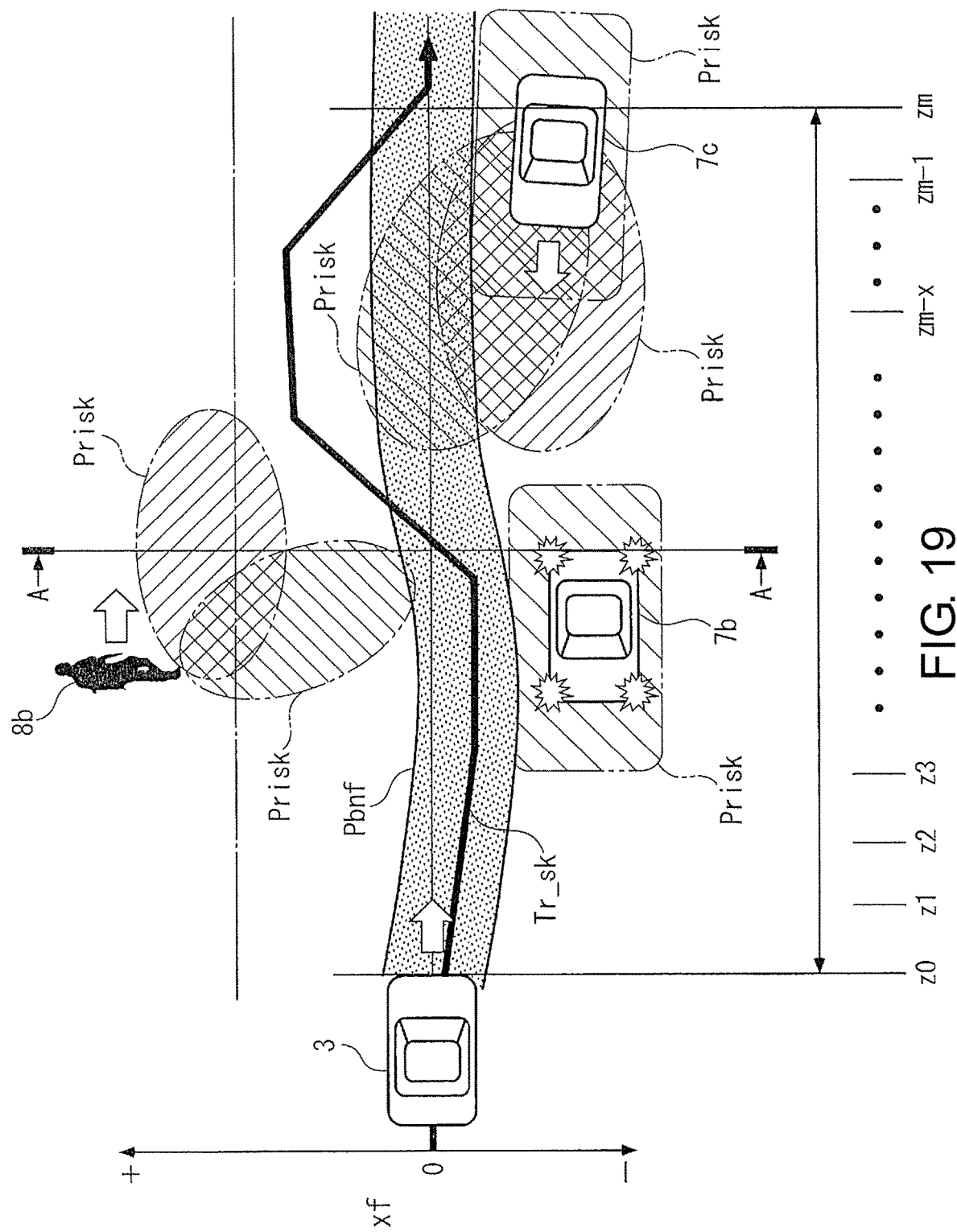
FIG. 19 is a diagram illustrating one example of a result of calculation of a running environment model.

FIG. 19 illustrates a running environment model under a running environment, in which a pedestrian 8b, another vehicle 3b that is stopped in an opposite lane, and another vehicle 3c running in an opposite lane are present as traffic participants, in a planar manner.

This running environment model estimating unit 40, first, calculates benefit potential Pbnf(zj) and risk potential Prisk(zj) corresponding to a search index zj by searching (retrieving) a running environment model using the time or the distance of the search index zj (here, j=0 to m; m is an integer) illustrated in FIG. 19. In this case, as the search index zj, time tf in the future is used in a case in which any one of the running track calculating techniques of Types 1 to 3 is used, and a road distance x is used in a case in which the running track calculating technique of Type 4 is used.

Then, by using the benefit potential Pbnf(zj) and the risk potential Prisk(zj) that have been retrieved, an evaluation function value J is calculated using the following Equation (22).

$$J(k) = \sum_{j=1}^{m} \{Pr\,isk(zj) + Kbnf\,(zj) \cdot Pbnf\,(zj)\} \tag{22}$$

In Equation (22) represented above, k is calculation time (search time), and Kbnf is a benefit potential correction coefficient. This benefit potential correction coefficient Kbnf is calculated by searching a map illustrated in FIG. 20 in accordance with the risk potential Prisk.

In the diagram, Prsk1 to Prsk2 are predetermined values of the risk potential Prisk set such that Prisk1<Prisk2 is satisfied. In this map, the benefit potential correction coefficient Kbnf is set to a value of "1" in an area in which Prisk≤Prisk1, is set to a value of "0" in an area Prisk2≤Prisk, and is set to a smaller value as the risk potential increases in an area in which Prisk1<Prisk<Prisk2. The reason for setting the benefit potential correction coefficient Kbnf as above will be described later. In addition, the principle of the technique of calculating the evaluation function value J as above will be described later as well.

Next, the extreme value search controller 50 described above will be described. As illustrated n FIG. 8, the extreme value search controller 50 includes: a washout filter 51; n reference signal generator 52_*i* (here, i=1 to n); n multipliers 53_*i* (here, i=1 to n); n moving average filters 54_*i*; n search controllers 55_*i* (here, i=1 to n); and a vector calculating unit 56.

This washout filter 51 calculates a filter value PW using the following Equation (23).

$$Pw(k)=J(k)-J(k-1) \quad (23)$$

As represented in Equation (23) described above, the filter value Pw is calculated as a difference between a current value J(k) and a previous value J(k−1) of the evaluation function value. The washout filter 51 is for passing a frequency component according to a reference signal value w_i to be described later that is included in the evaluation function value J. In this case, instead of Equation (23) represented above, the filter value pw may be calculated using a Butterworth high pass filter algorithm passing frequency components of n reference signal values w_i to be described later, and n filter values Pw may be configured to be calculated using n band pass filter algorithms passing only frequency components of n reference signal values w_i.

In addition, n reference signal values w_i (here, i=1 to n) are output from n reference signal generators 52_*i*. Such n reference signal values w_i are set to periodical function values having different periods, and such periods are set to products m_i·ΔTsk of mutually-different n values m_i (here, i=1 to n) and a calculation period ΔTsk. In addition, as the waveform of the periodical functional, for example, a sine wave, a cosine wave, a triangle wave, a trapezoidal wave, a rectangular wave, or the like is used.

In addition, n intermediate values Pc_i (here, i=1 to n) are calculated by the n multipliers 53*i* using the following Equation (24).

$$Pc\_i(k)=Pw(k)\cdot w\_i(k-1) \quad (24)$$

Furthermore, n moving average values Pa_i are calculated by the n moving average filters 54_*i* using the following Equation (25).

$$Pa\_i(k) = (1/(1+m1cm))\sum_{r=0}^{m\_1cm} Pc\_i(r) \quad (25)$$

In Equation (25) represented above, m1cm is a maximum common multiple of the value m_i described above. In this way, the reason for setting the sampling number of moving average values Pa_1 to m1cm+1 is for eliminating the frequency component of the reference signal value w_i from the moving average value Pa_i.

Next, the n search controllers 55_*i* calculate n correction coefficients kθ_i (here, i=1 to n) using a sliding mode control algorithm represented in the following Equations (26) and (27).

$$\sigma\_i(k)=Pa\_i(k)+S\_i\cdot Pa\_i(k-1) \quad (26)$$

$$k\theta\_i(k)=k\theta\_i(k-1)+Ksk\_i\cdot\sigma\_i(k) \quad (27)$$

In Equation (26) represented above, σi (here, i=1 to n) is a change-over function, and Si (here, i=1 to n) is a response designation parameter set such that −1<S_i<0 is satisfied. In addition, Ksk_i (here, i=1 to n) represented in Equation (27) is a predetermined gain. As is apparent by referring to Equations (26) and (27) represented above, the n correction coefficients kθ_i are calculated to have a function of causing n moving average values Pa_i to converge to a value of "0" using a sliding mode control algorithm having only an input of an adaptation rule.

In this case, the n correction coefficients kθ_i can be represented as a search track correction vector Kθ represented in the following Equation (28).

$$K\theta(k)=[k\theta\_1(k) \ldots k\theta\_n(k)] \quad (28)$$

In the case of Equation (28) represented above, elements on the right side correspond to elements on the right side of Equation (5) described above in a case in which the running track calculating technique of Type 1 is used, correspond to elements on the right side of Equation (10) described above in a case in which the running track calculating technique of Type 2 is used, and correspond to elements on the right side of Equation (15) described above in a case in which the running track calculating technique of Type 3 is used. In addition, in a case in which the running track calculating technique of Type 4 is used, instead of the predetermined value n described above, calculation of Equations (22) to (28) is performed using a double value 2n thereof, and the right side of Equation (28) of that case correspond to elements on the right side of Equation (21) described above.

Then, the vector calculating unit 56 calculates a final search track correction vector Kθ_sk using the flowing Equations (29) and (30).

$$k\theta\_i\_sk(k)=k\theta\_i(k-1)+w\_i(k) \quad (29)$$

$$K\theta\_sk(k)=[k\theta\_1\_sk(k) \ldots k\theta\_n\_sk(k)] \quad (30)$$

As is apparent by comparing Equations (29) and (30) represented above with Equations (27) and (28) that have been previously described, in the case of the final search track correction vector Kθ_sk, each element kθ_i_sk thereof is calculated as a value acquired by adding the reference signal value w_i to each element kθ_i of the search track correction vector Kθ. Accordingly, as a result, the running track Tr_sk is calculated using the search track correction vector Kθ. For example, in the case of the running track calculating techniques of Types 1 and 2, the running track Tr_sk is calculated by correcting the reference track wbs using the search track correction vector Kθ.

As above, the running environment model estimating unit 40 calculates the evaluation function value J using the calculation method described above, and the extreme value search controller 50 calculates the final search track correction vector Kθ_sk using the calculation technique described above. Next, the principles of the calculation techniques of the evaluation function value J and the final search track correction vector Kθ_sk will be described.

Figure 21:
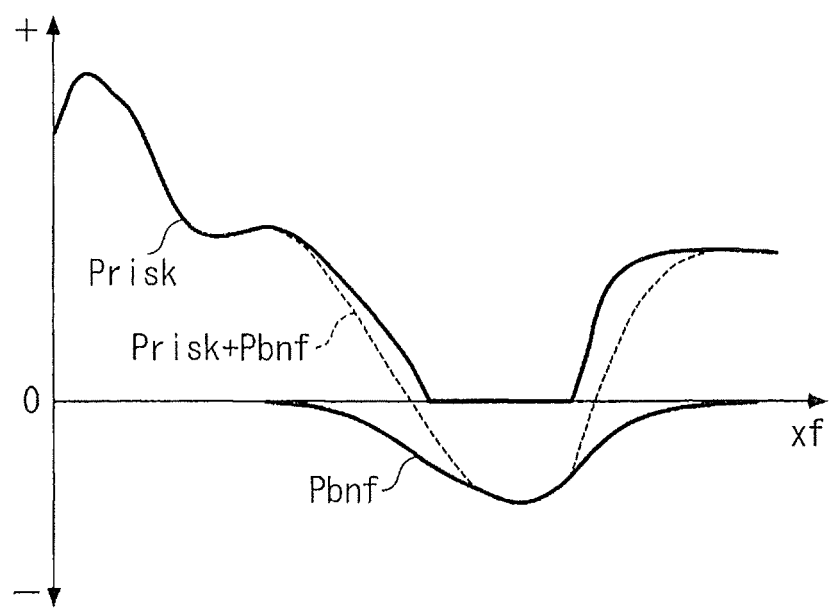
FIG. 21 is a diagram illustrating risk potential Prisk and benefit potential Pbnf according to time along a line A-A illustrated in FIG. 19.

First, the principle of the calculation technique of the evaluation function value J will be described. For example, in a case in which the running track Tr_sk is calculated using any one of the running track calculating techniques of Types 1 to 4, at the time of a search index denoted by line A-A illustrated in FIG. 19, the risk potential Prisk and the benefit potential Pbnf, for example, are as illustrated in FIG. 21.

Figure 22:
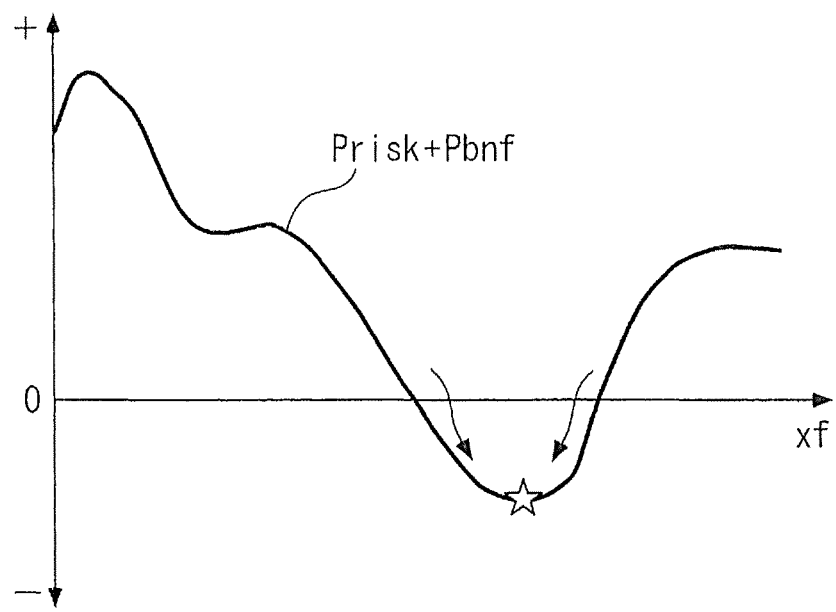
FIG. 22 is a diagram for describing the position of the most ideal running track Tr_sk.

As illustrated in the drawing, the risk potential Prisk is represented as a positive value, and the benefit potential Pbnf is represented as a negative value. Accordingly, the position of the most ideal running track Tr_sk is a point (a point denoted by "*") at which a sum Prisk+Pbnf of the risk potential Prisk and the benefit potential Pbnf has a minimum value (in other words, a minimal value) as illustrated in FIG. 22.

Accordingly, in a case in which the running track Tr_sk is determined to be the most ideal running track, the evaluation function value J thereof may be considered to be defined using the sum Prisk+Pbnf of the two values. However, under a condition in which the area of the benefit potential Pbnf and the area of the risk potential Prisk overlap with each other when seen in a plane (for example, at the time of a search index zm-x illustrated in FIG. 19), when the running track Tr_sk is determined as being the position of the minimum value of the sum Prisk+Pbnf of the two values, a possibility that the subject vehicle 3 is in contact with a traffic participant is high.

Figure 20:
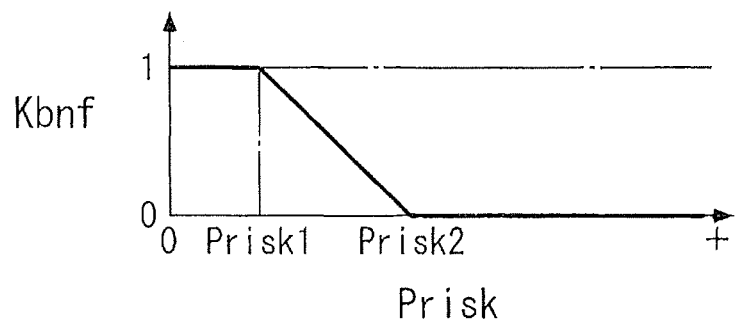
FIG. 20 is a diagram illustrating one example of a map used for calculating a benefit potential correction coefficient Kbnf.

In order avoid such an event, as the evaluation function value J according to this embodiment, as represented in Equation (22) of calculation, a value Kbnf·Pbnf acquired by multiplying the benefit potential Pbnf by the benefit potential correction coefficient Kbnf is used, and the benefit potential correction coefficient Kbnf, as illustrated in FIG. 20 described above, is set to a value of "0" in an area in which the risk potential Prisk is higher than a predetermined value Prisk2, whereby the risk potential Prisk is configured to be prioritized in the calculation of the evaluation function value J.

Accordingly, under a condition in which the area of the benefit potential Pbnf and the area of the risk potential Prisk overlap with each other when seen in a plane, it can be avoided that the running track Tr_sk crosses an area having high risk potential Prisk, and it can be avoided that the subject vehicle 3 is in contact with a traffic participant. From the reason described above, the evaluation function value J is calculated using the benefit potential correction coefficient Kbnf.

Next, the principle of calculation of the final search track correction vector Kθ sk will be described. First, in order to calculate an optimal track of the running track Tr_sk, the running track Tr_sk may be calculated such that the degree of crossing with an area in which the risk potential Prisk is present has a minimum value, and the degree of crossing with an area in which the benefit potential Pbnf is present has a maximum value.

In other words, a point at which the sum of the risk potential Prisk and the benefit potential Pbnf has a minimum value is an optimal track of the running track Tr_sk at that time, and accordingly, the running track Tr_sk may be determined such that the evaluation function value J is the minimum value (in other words, the minimal value). In such a case, since the running track Tr_sk, as described above, is calculated using the final search track correction vector Kθ_sk, the final search track correction vector Kθ sk may be calculated such that the evaluation function value J is the minimum value.

Accordingly, in the case of this embodiment, in order to calculate the final search track correction vector Kθ_sk such that the evaluation function value J is the minimum value, the following principle is used. First, since the running track Tr_sk is calculated using the final search track correction vector Kθ sk, the vibrational behavior of a predetermined amplitude appears in accordance with the characteristics (periodical function) of the reference signal value w_i included in the final search track correction vector Kθ_sk. In addition, since the risk potential Prisk and the benefit potential Pbnf are calculated using the running track Tr_sk, the evaluation function value J represents a vibrational behavior of a predetermined amplitude as well.

Figure 23:
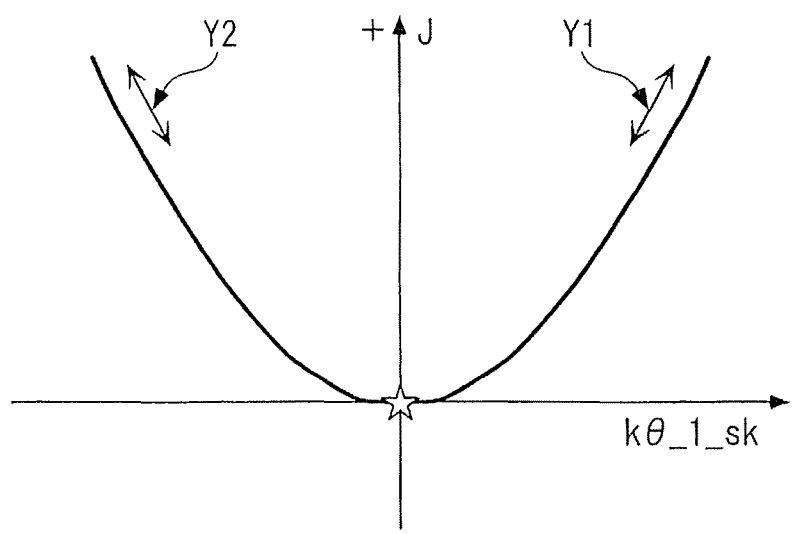
FIG. 23 is a diagram for describing a relation between an evaluation function value J and one element kθ_1_sk of a final search track correction vector Kθ_sk.

Here, in a case in which it is assumed that a relation between one element kθ_1_sk of the final search track correction vector Kθ_sk and the evaluation function value J is assumed to be represented as a curve illustrated in FIG. 23, the vibrational behavior of the evaluation function value J according to the reference signal value w_i, as denoted by an arrow Y1 or Y2 in the drawing, is in a state having a certain inclination. Meanwhile, the moving average value Pa_i is a moving average value of the product of the filter value Pw of the evaluation function value J and the reference signal value w_i and thus is a value corresponding to a correlation function of the evaluation function value J and the reference signal value w_i.

Figure 24:
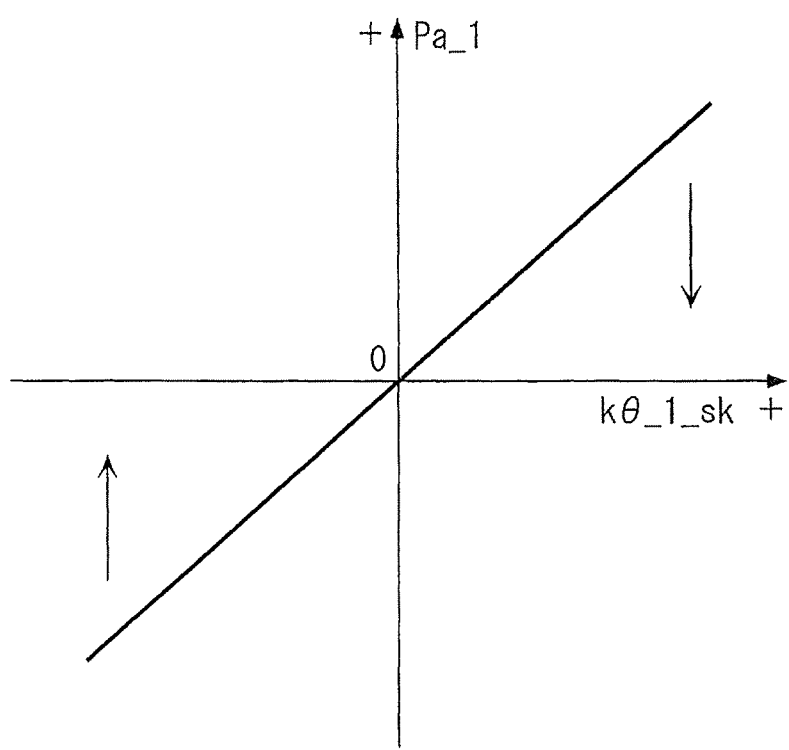
FIG. 24 is a diagram for describing a relation between a moving average value Pa_i and one element kθ_1_sk of the final search track correction vector Kθ_sk.

For this reason, when the moving average value Pa_i corresponding to the correlation function is a positive value, the inclination of the evaluation function value J represents a positive value. On the other hand, when the moving average value Pa_i is a negative value, the inclination of the evaluation function value J represents a negative value. In addition to this, the moving average value Pa_i is calculated using Equation (25) described above and thus is calculated in a state in which a frequency component of the reference signal value w_i is eliminated. From the reason described above, the relation between the moving average value Pa_i and the element kθ_1_sk, for example, can be represented as a monotonously increasing function as illustrated in FIG. 24. In other words, the moving average value Pa_i represents a direction in which the evaluation value J changes when the running track Tr_sk is changed.

Accordingly, in order to calculate the final search track correction vector Kθ_sk such that the evaluation function value J is the minimum value (minimal value), the moving average value Pa_i may be calculated such that the inclination of the function illustrated in FIG. 24 is "0." In other words, the final search track correction vector Kθ_sk may be calculated using a feedback control algorithm such that the moving average value Pa_i converges on "0".

From the reason described above, the extreme value search controller 50 according to this embodiment calculates the final search track correction vector Kθ_sk using a calculation algorithm represented in Equations (23) to (30) including the sliding mode control algorithm represented in Equations (26) and (27) as a feedback control algorithm.

In this way, in a case in which the minimum value of the evaluation function value J is searched, in a general extreme value search algorithm, although data of the inclination of the evaluation function value J is necessary, in this calculation algorithm according to this embodiment, data of the inclination of the evaluation function value J is not necessary. As a result, in the case of the calculation algorithm according to this embodiment, the calculation load can be decreased to be smaller than that of a general extreme value search algorithm, and there is an advantage that the calculation accuracy can be improved. From the same reason, in the case of being applied to a system changing with respect to time such as a system determining a running track in an automatic driving apparatus, although the robustness decreases in a general extreme value search algorithm, there is an advantage that high robustness can be secured in the calculation algorithm according to this embodiment.

In addition, as described above, since the moving average value Pa_i is a value (direction value) representing an inclination of the evaluation function value J, in other words, a direction in which the evaluation function value J changes when the running track Tr_sk is changed, the calculating of the final search track correction vector Kθ_sk such that the evaluation function value J is a minimum value (in other words, the moving average value Pa_i converges on "0") corresponds to the calculating of the final search track correction vector Kθ_sk such that the degree of crossing with an area in which the risk potential Prisk is present has a minimum value, and the degree of crossing with an area in which the benefit potential Pbnf is present has a maximum value.

In addition, since the evaluation function value J is calculated using the benefit potential correction coefficient Kbnf, in a case in which the area in which the risk potential Prisk is present and the area in which the benefit potential Pbnf is present cross with each other, the final search track correction vector Kθ_sk is calculated such that the degree of crossing between the running track Tr_sk and the area in which the risk potential Prisk is present is further decreased as the risk potential Prisk is higher. As a result, a contact between the subject vehicle 3 and a traffic participant can be avoided.

Figure 25:
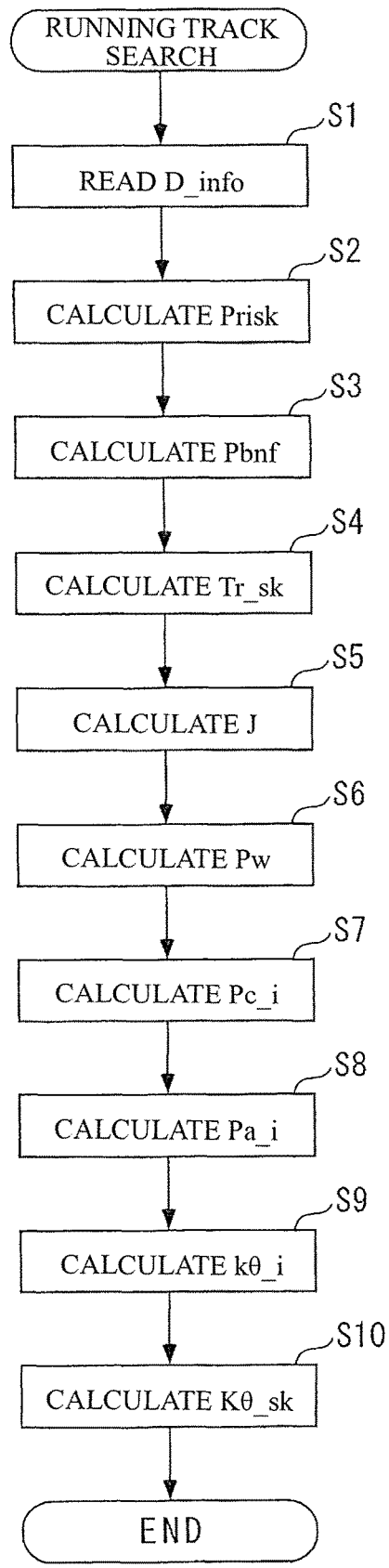
FIG. 25 is a flowchart illustrating a running track searching process.

Next, a running track search process will be described with reference to FIG. 25. This running track searching process calculates the running track Tr_sk, the evaluation function value J, the final search track correction vector Kθ_sk, and the like using the calculation technique described above and is performed by the ECU 2 at the predetermined calculation period ΔTsk described above. Various values calculated in the following description are assumed to be stored in the E2PROM of the ECU 2.

As illustrated in the drawing, first, in Step 1 (in the drawing, it will be abbreviated as "Si"; hereinafter the same) reads the surrounding status data D_info from the status detecting device 4.

Thereafter, the process proceeds to Step 2, and the risk potential Prisk is calculated by searching a map not illustrated in the drawing in accordance with the running track Tr_sk and the surrounding status data D_info stored in the E2PROM. In this case, the values of the risk potential Prisk for the search indexes z0 to zm are calculated, and such values are overwritten into previous values (values for the search indexes z0 to zm) stored in the E2PROM.

Next, in Step 3, the benefit potential Pbnf is calculated by searching a map not illustrated in the drawing in accordance with the running track Tr_sk and the surrounding status data D_info stored in the E2PROM. In this case, the values of the benefit potential Pbnf for the search indexes z0 to zm are calculated, and such values are overwritten into previous values (values for the search indexes z0 to zm) stored in the E2PROM.

Step 4 following Step 3, the running track Tr_sk is calculated. More specifically, on the basis of the surrounding status data D_info, one of the calculation equations of the running track calculating techniques of Types 1 to 4, in other words, Equations (1) to (5), Equations (6) to (10), Equations (11) to (15), and Equations (16) to (21) is selected, and the running track Tr_sk is calculated by substituting the elements of the final search track correction vector Kθ_sk with the elements of the search track correction vector Kθ of the selected calculation equation.

In this case, the values of the running track Tr_sk for the search indexes z0 to zm are calculated, and such values are overwritten into the previous values (values for the search indexes z0 to zm) stored in the E2PROM. In other words, the running track Tr_sk is sequentially updated in a calculation period ΔTsk.

Next, the process proceeds to Step 5, and, after the evaluation function value J is calculated using Equation (22) described above, in Step 6, the filter value Pw is calculated using Equation (23) described above.

Next, in Step 7, after n intermediate values Pc_i are calculated using Equation (24) described above, the process proceeds to Step 8, and n moving average values Pa_i are calculated using Equation (25) described above.

Next, the process proceeds to Step 9, and the search track correction vector Kθ is calculated using Equations (26) to (28) described above.

Next, in Step 10, after the final search track correction vector Kθ_sk is calculated using Equations (29) and (30) described above, this process ends.

As above, in the automatic driving apparatus 1 according to this embodiment, the final search track correction vector Kθ_sk is sequentially updated in a predetermined calculation period ΔTsk, and, at the next timing, the running track Tr_sk is sequentially updated using the final search track correction vector Kθ_sk updated as such.

Figure 26:
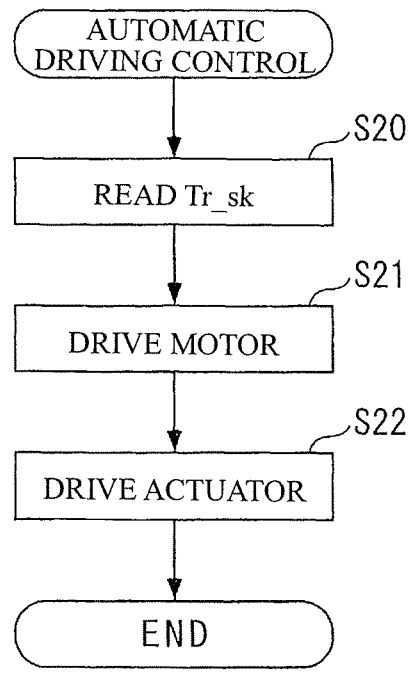
FIG. 26 is a flowchart illustrating an automatic driving control process.

Next, an automatic driving control process will be described with reference to FIG. 26. This automatic driving control process performs control such that the subject vehicle 3 runs in the calculated running track Tr_sk and is performed by the ECU 2 in a predetermined control period ΔTad longer than the predetermined calculation period ΔTsk described above.

In illustrated in the drawing, first, in Step 20, a running track Tr_sk stored in the E2PROM is read.

Next, the process proceeds to Step 21, and the motor 5 is driven such that the subject vehicle 3 runs in the read running track Tr_sk.

Next, in Step 22, after the actuator 6 is driven such that the subject vehicle 3 runs in the read running track Tr_sk, this process ends.

Figure 27:
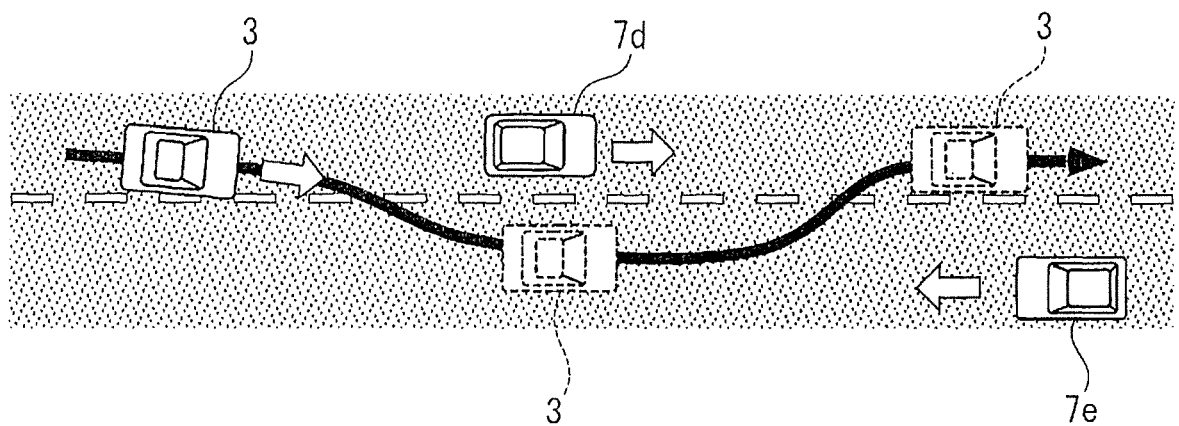
FIG. 27 is a diagram illustrating a running environment condition in which a simulation of a running track searching process is performed.

Next, a result of a simulation of the running track determining process performed by the automatic driving apparatus 1 according to this embodiment configured as above will be described. The result of the simulation described below is acquired, under a running environment condition in which a preceding vehicle 7d and an oncoming vehicle 7e are present as illustrated in FIG. 27, when the preceding vehicle 7d is overtaken using the running track calculating technique of Type 1 described above.

Figure 28:
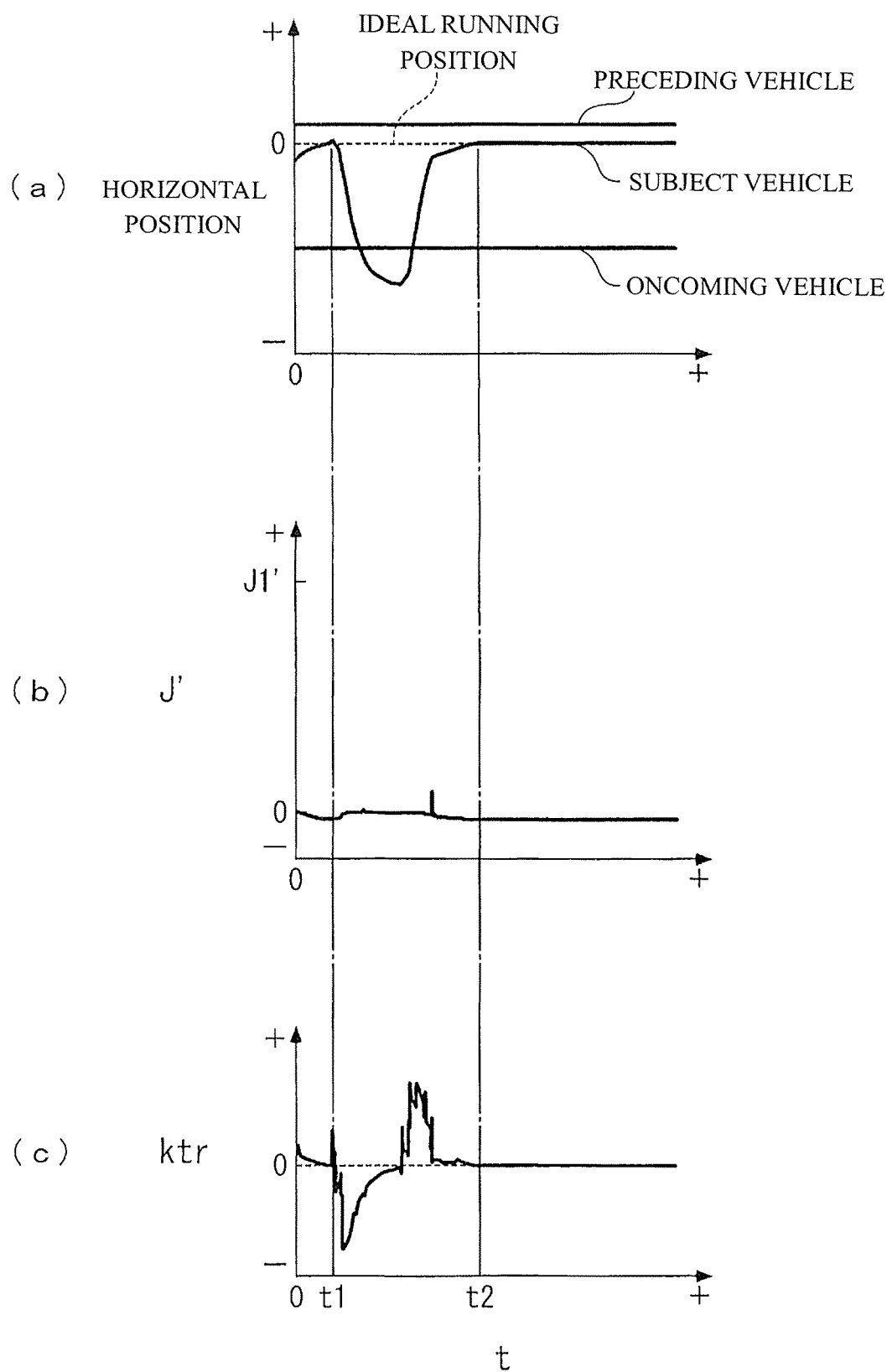
FIG. 28 is a diagram illustrating results of simulations of (a) horizontal positions of the subject vehicle and the like, (b) an evaluation function value J', and (c) a track correction coefficient ktr when a running track searching process according to this embodiment is performed.
Figure 29:
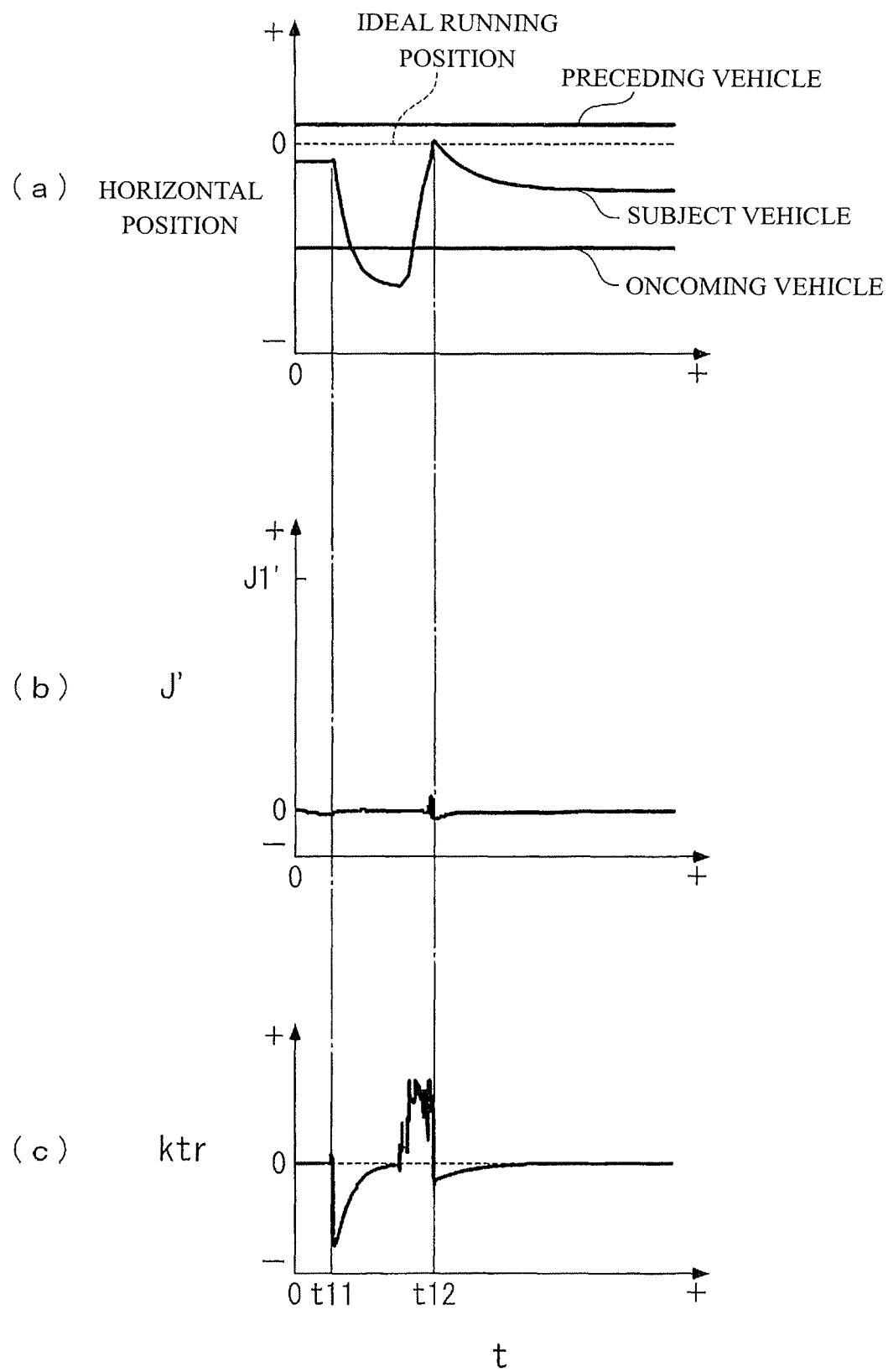
FIG. 29 is a diagram illustrating results of simulations of (a) horizontal positions of the subject vehicle and the like, (b) an evaluation function value J', and (c) a track correction coefficient ktr when a running track searching process is performed with benefit potential Pbnf omitted for comparison.
Figure 30:
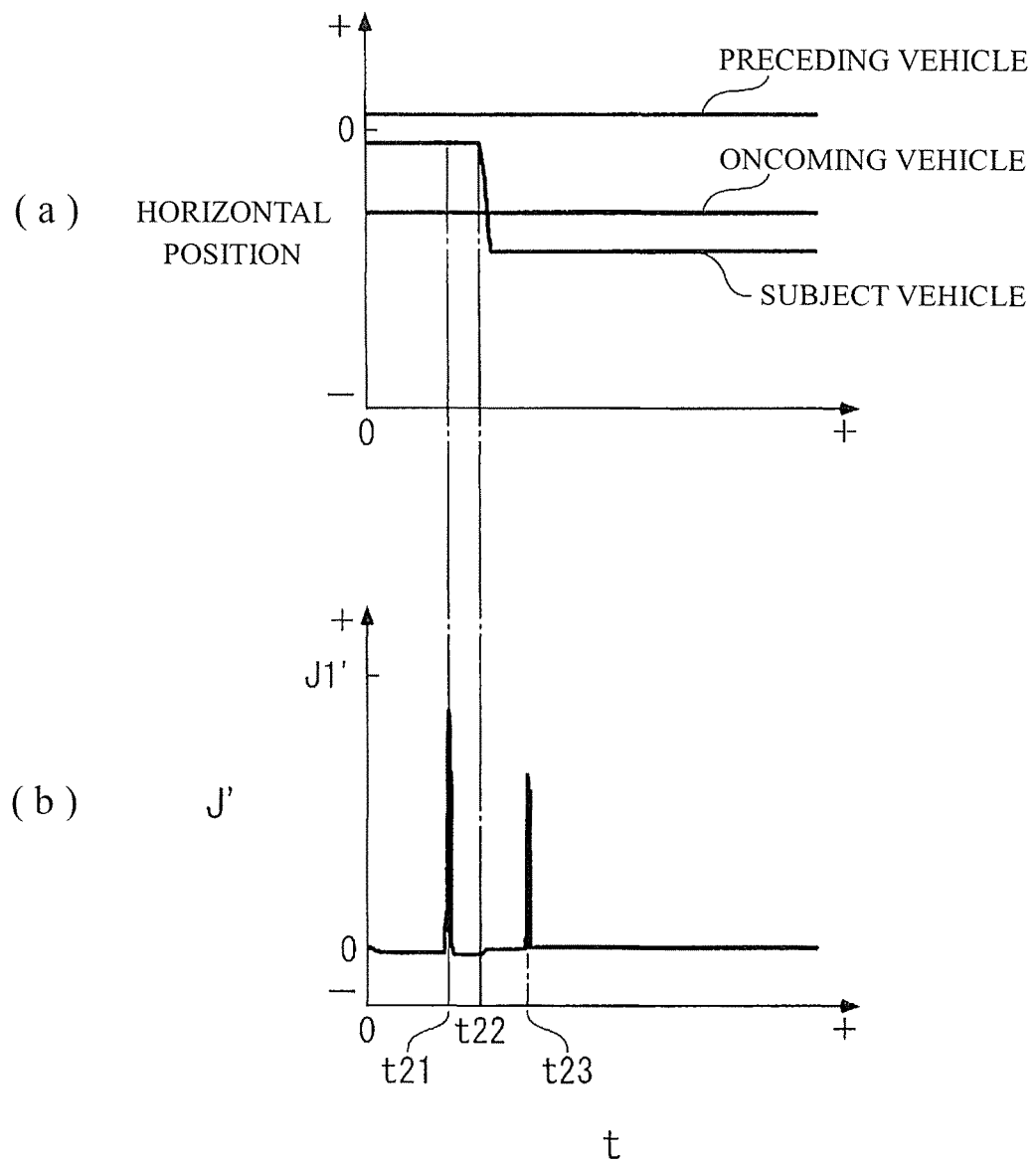
FIG. 30 is a diagram illustrating results of simulations of (a) horizontal positions of the subject vehicle and the like and (b) an evaluation function value J' when a running track searching process is performed with the final search track correction vector Kθ_sk omitted for comparison.

First, FIG. 28 illustrates a simulation result of the running track determining process performed by the automatic driving apparatus 1 according to this embodiment (hereinafter, referred to as "present result"). FIG. 29, for a comparison, illustrates a simulation result of the running track determining process when the benefit potential Pbnf is omitted (hereinafter, referred to as "first comparative result"). FIG. 30, for a comparison, illustrates a simulation result of the running track determining process when the final search track correction vector Kθ_sk is omitted (hereinafter, referred to as "second comparative result").

In FIGS. 28 to 30, J' is an evaluation function value of only at the front end position of the subject vehicle 3 and is calculated using the following Equation (31).

$$J'(k)=\text{Prisk}(z')+\text{Kbnf}(z')\cdot\text{Pbnf}(z') \quad (31)$$

This Equation (31) z' is a search index at the front end position of the subject vehicle 3.

First, by referring to the second comparison result, it can be understood that, at time t21, the evaluation function value J' rapidly increases to near a predetermined value J1'. This predetermined value J1' is a value representing that the subject vehicle 3 collides with a traffic participant or the like, and a rapid increase in the evaluation function value J' at this time t21 is due to collision of the subject vehicle 3 with the preceding vehicle 7d.

In addition, after lane change is started at time t22, it can be understood that, at time t23, the evaluation function value J' rapidly increases to near the predetermined value J1' again. This is due to a collision of the subject vehicle 3 with an oncoming vehicle 7e.

In contrast to this, in the case of the present result, an overtaking operation is started at time t1, and, after lane change is performed, the subject vehicle is returned to an ideal running position at time t2. Therebetween, different from a collision with another vehicle as in the second comparative result, it can be understood that the evaluation function value J' hardly rises, and the running track Tr_sk can be appropriately determined.

In addition, by referring to the first comparative result, in the case of the first comparative result, an overtaking operation is started at time t11, after lane change is performed, the subject vehicle is returned to the original running position at time t12. Therebetween, the evaluation function value J' hardly rises, similar to the present result, and it can be understood that the running track Tr_sk can be appropriately determined from that point.

However, in the case of the first comparative example, while the subject vehicle 3 is separated from the ideal running position after time t12, in the case of the present result, as described above, it can be understood that the subject vehicle 3 is returned to an ideal running position after time t2. In other words, in the case of the present result, it can be understood that, by using the benefit potential Pbnf, the subject vehicle 3 can be returned to the ideal running position, and the running track Tr_sk can be determined more appropriately.

As above, according to the automatic driving apparatus 1 of this embodiment, the risk potential Prisk and the benefit potential Pbnf are calculated using the surrounding status data D_info detected by the status detecting device 4 and the running track Tr_sk. Then, on the basis of the surrounding status data D_info, one of the running track calculating techniques of Types 1 to 4 is selected, and a running track Tr_sk from the present to the future is calculated using the selected running track calculating technique and the final search track correction vector Kθ_sk.

In the case of this final search track correction vector Kθ_sk, by using the risk potential Prisk, the benefit potential Pbnf, and the benefit potential correction coefficient Kbnf, the evaluation function value J is calculated using Equation (22), and the final search track correction vector Kθ_sk (in other words, the search track correction vector Kθ) is calculated such that this evaluation function value J is the minimum value. This corresponds to calculating of the final search track correction vector Kθ_sk such that the degree of crossing with an area in which the risk potential Prisk is present is minimum, and the degree of crossing with an area in which the benefit potential Pbnf is present is maximum.

In addition, the running track Tr_sk is calculated by correcting the reference track wbs, the track weighting factor function value Wtr_i, and the like using the final search track correction vector Kθ_sk, and accordingly, when the running track Tr_sk is calculated, different from Patent Document 1, the presence probabilities of obstacles in a plurality of grids surrounding is own vehicle 3 do not need to be calculated or estimated, and the running track Tr_sk can be appropriately calculated in a speedy manner. Accordingly, similar to a case in which the subject vehicle 3 is driven by a skilled driver, a safe and ideal running state of the subject vehicle 3 can be realized through automatic driving, and thus, high marketability can be secured.

In addition, in the case of the running track calculating techniques of Types 1 and 2, the running track Tr_sk is determined by correcting the reference track wbs defined in a map pattern using the final search track correction vector Kθ_sk (in other words, the search track correction vector Kθ), and accordingly, determination of the running track Tr_sk that cannot be followed by the subject vehicle 3 can be avoided while avoiding crossing of the running track Tr_sk of the subject vehicle 3 with an presence area of a traffic participant, and the speed of the subject vehicle 3 in the horizontal direction can be appropriately set. Accordingly, a safe and ideal running state can be realized through automatic driving while an unstable behavior of the subject vehicle 3 such as spinning or meandering is prevented.

In addition, in the case of the running track calculating technique of Type 3, the running track Tr_sk is determined by composing values acquired by correcting the track weighting factor function value Wtr_i using the final search track correction vector Kθ_sk (in other words, the search track correction vector Kθ), and accordingly, the running track Tr_sk under a running environment such as a case in which, while avoiding crossing of the running track Tr_sk of the subject vehicle 3 with an presence area having a possibility of the presence of a traffic participant, after the subject vehicle 3 changes its route to the left side, the route is changed to the right side or a case in which zigzag running is repeated can be appropriately set, and, under such a running environment, smooth and safe automatic driving can be realized.

In addition to this, in the case of the running track calculating technique of Type 4, the running track Tr_sk is determined in in a state in which n segments are combined at n angles, and the running track Tr_sk is corrected using the final search track correction vector Kθ_sk. Accordingly, the running track Tr_sk under a running environment such as a case in which, while avoiding crossing of the running track Tr_sk of the subject vehicle 3 with an presence area of a traffic participant, the subject vehicle 3 makes a left turn or a right turn at an intersection or a case of merging in an expressway can be appropriately set, and accordingly, under such a running environment, smooth and safe automatic driving can be realized.

In addition, when the final search track correction vector Kθ_sk is calculated, the moving average value Pa_i is calculated as a value representing the direction of a change in the degree of crossing between the running track Tr_sk and an presence area represented by presence area data when the running track Tr_sk is changed, and the final search track correction vector Kθ_sk is calculated such that this moving average value Pa_i is "0". Accordingly, a calculation time at the time of calculating the running track Tr_sk can be shortened, and the calculation load can be decreased. As a result, the manufacturing cost of the automatic driving apparatus 1 can be decreased, and the automatic driving apparatus 1 can be realized using an arithmetic operation device having relatively low capability. From the same reason, by using this automatic driving apparatus 1, high-speed running of an automatic driving vehicle can be realized.

In addition, although the embodiment is an example in which the risk potential Prisk is used as presence area data, the presence area data of the disclosure is not limited thereto and may represent an presence area, which is an area having a possibility of the presence of a traffic participant from the present to the future or an area having a possibility of the presence of a traffic participant in the future, in the surroundings of the subject vehicle. For example, the risk potential Prisk may be configured to be calculated using an area having a possibility of the presence of a traffic participant in the future in the surroundings of the subject vehicle as presence area data representing an presence area.

In addition, although the embodiment is an example in which the benefit potential Pbnf is used as running area data, the running area data of the disclosure is not limited thereto and may represent an ideal running area in the future in which the subject vehicle should run.

Furthermore, although the embodiment is an example in which the running track Tr_sk is determined using both the risk potential Prisk and the benefit potential Pbnf, the running track Tr_sk may be determined using only the risk potential Prisk. In such a case, as an equation for calculating the evaluation function value J, an equation acquired by setting Pbnf(zj)=0 in Equation (22) described above may be used. In addition, in a case in which the running track Tr_sk is determined using only the risk potential Prisk, the running track Tr_sk may be determined using other parameters in addition to the risk potential Prisk, the surrounding status data D_info, and the final search track correction vector Kθ sk.

Meanwhile, while the embodiment is an example in which the running track Tr_sk is determined using the surrounding status data D_info, the risk potential Prisk, the benefit potential Pbnf, and the final search track correction vector Kθ_sk, the running track Tr_sk may be determined additionally using other parameters.

In addition, although the embodiment is an example in which Equations (1) to (30) are used as the algorithm used for calculating the search track correction vector Kθ, the algorithm used for calculating the search track correction vector Kθ is not limited thereto and may be an algorithm that can calculate the search track correction vector Kθ such that the degree of crossing between the running track in the future and the presence area represented by the presence area data has a value near a minimum value or the minimum value or an algorithm that can calculate the search track correction vector Kθ such that the degree of crossing between the running track in the future and the presence area represented by the presence area data has a value near a minimum value or the minimum value, and the degree of crossing between the running track in the future and the running area represented by the running area data has a value near a maximum value or the maximum value.

Furthermore, although the embodiment is an example in which the automatic driving apparatus 1 and the running track determining device 1 according to the disclosure are applied to a four-wheels vehicle, the automatic driving apparatus and the running track determining device according to the disclosure are not limited thereto and may be applied to a two-wheels vehicle, a three-wheels vehicle, and five or more wheels vehicle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A running track determining device comprising:
 a status detecting device that acquires surrounding status data representing a surrounding status of a subject vehicle;
 an ECU that calculates presence area data representing a presence area that is an area having a possibility of presence of a traffic participant from the present to the future or an area having a possibility of presence in the future in surroundings of the subject vehicle using the surrounding status data;
 the ECU determines a running track of the subject vehicle in the future using the presence area data and a value acquired by correcting a predetermined function value using a correction value; and
 the ECU calculates the correction value using a predetermined algorithm such that the degree of crossing of the running track in the future and the presence area represented by the presence area data has a value near a minimum value or the minimum value.

2. The running track determining device according to claim 1, wherein the predetermined function value is a function value that defines a form when the subject vehicle changes a route as a map in advance.

3. The running track determining device according to claim 2,
 wherein the predetermined function value is a function value that defines a route change speed when the subject vehicle changes the route, and
 wherein the correction value is configured to correct the route change speed.

4. The running track determining device according to claim 1,
 wherein the predetermined function value is configured of a plurality of function values intersecting with each other,
 wherein the correction value is configured of a plurality of correction values, and
 wherein the ECU determines the running track in the future by composing a plurality of values acquired by correcting the plurality of function values using the plurality of correction values.

5. The running track determining device according to claim 1, wherein the predetermined function value is configured of a function value acquired by combining a plurality of segments forming an angle, and the correction value is configured to correct at least one of lengths of the plurality of segments and the angle.

6. The running track determining device according to claim 1, wherein the ECU calculates a direction value representing a direction of a change in the degree of crossing of the running track in the future and the presence area represented by the presence area data when the running track in the future is changed using the predetermined algorithm and calculates the correction value such that the running track in the future is changed in a direction in which the degree of crossing with the presence area decreases using the direction value.

7. The running track determining device according to claim 1, wherein:
 the ECU calculates no-running area data representing a no-running area in which the subject vehicle should not run using the surrounding status data; and
 the ECU calculates the correction value such that the degree of crossing of the running track in the future and the no-running area represented by the no-running area data has a value near a minimum value or the minimum value in addition to the degree of crossing of the running track in the future and the presence area represented by the presence area data using the predetermined algorithm.

8. The running track determining device according to claim 1, wherein:
 the ECU calculates running area data representing an ideal running area in the future in which the subject vehicle should run; and
 the ECU calculates the correction value using the predetermined algorithm such that the degree of crossing of the running track in the future and the presence area represented by the presence area data has a value near a minimum value or the minimum value, and the degree of crossing of the running track in the future and the running area represented by the running area data has a value near a maximum value or the maximum value.

9. The running track determining device according to claim 8, wherein the ECU, in a case in which the running area represented by the running area data and the presence area represented by the presence area data cross each other, calculates the correction value such that the degree of crossing of the running track in the future and the presence area represented by the presence area data decreases as a presence probability of the traffic participant in the crossing area increases.

10. A running track determining device comprising:
a status detecting device that acquires surrounding status data representing a surrounding status of a subject vehicle;
an ECU that calculates presence area data representing a presence area that is an area having a possibility of presence of a traffic participant from the present to the future or an area having a possibility of presence in the future in surroundings of the subject vehicle using the surrounding status data;
the ECU calculates running area data representing an ideal running area in the future in which the subject vehicle should run; and
the ECU determines a running track of the subject vehicle in the future using the presence area data and the running area data.

11. The running track determining device according to claim 10, wherein the ECU determines the running track in the future such that the degree of crossing of the running track in the future and the presence area represented by the presence area data has a value near a minimum value or the minimum value, and the degree of crossing of the running track in the future and the running area represented by the running area data has a value near a maximum value or the maximum value.

12. The running track determining device according to claim 10, wherein the ECU determines a reference running track that is a reference of the running track in the future and determines the running track in the future by correcting the reference running track such that the degree of crossing of the running track in the future and the area represented by the presence area data has a value near a minimum value or the minimum value, and the degree of crossing of the running track in the future and the running area represented by the running area data has a value near a maximum value or the maximum value.

13. The running track determining device according to claim 11, wherein the ECU determines a reference running track that is a reference of the running track in the future and determines the running track in the future by correcting the reference running track such that the degree of crossing of the running track in the future and the area represented by the presence area data has a value near a minimum value or the minimum value, and the degree of crossing of the running track in the future and the running area represented by the running area data has a value near a maximum value or the maximum value.

14. The running track determining device according to claim 11, wherein the ECU, in a case in which the running area represented by the running area data and the presence area represented by the presence area data cross each other, determines the running track in the future such that the degree of crossing of the running track in the future and the presence area represented by the presence area data decreases as a presence probability of the traffic participant in the crossing area increases.

15. An automatic driving apparatus comprising:
a running track determining device, comprising:
a status detecting device that acquires surrounding status data representing a surrounding status of a subject vehicle;
an ECU that calculates presence area data representing a presence area that is an area having a possibility of presence of a traffic participant from the present to the future or an area having a possibility of presence in the future in surroundings of the subject vehicle using the surrounding status data;
the ECU determines a running track of the subject vehicle in the future using the presence area data and a value acquired by correcting a predetermined function value using a correction value; and
the ECU calculates the correction value using a predetermined algorithm such that the degree of crossing of the running track in the future and the presence area represented by the presence area data has a value near a minimum value or the minimum value,
wherein a running state of the subject vehicle is controlled to run in the running track in the future that is determined by the running track determining device.

16. An automatic driving apparatus comprising:
a running track determining device according to claim 10, comprising:
a status detecting device that acquires surrounding status data representing a surrounding status of a subject vehicle;
an ECU that calculates presence area data representing a presence area that is an area having a possibility of presence of a traffic participant from the present to the future or an area having a possibility of presence in the future in surroundings of the subject vehicle using the surrounding status data;
the ECU calculates running area data representing an ideal running area in the future in which the subject vehicle should run; and
the ECU determines a running track of the subject vehicle in the future using the presence area data and the running area data,
wherein a running state of the subject vehicle is controlled to run in the running track in the future that is determined by the running track determining device.

* * * * *